US011811942B2

(12) United States Patent
Bartolucci et al.

(10) Patent No.: US 11,811,942 B2
(45) Date of Patent: Nov. 7, 2023

(54) BLOCKCHAIN-IMPLEMENTED METHODS AND SYSTEMS FOR AUTHORISATION BASED ON BILINEAR MAP ACCUMULATORS

(71) Applicant: nChain Licensing AG, Zug (CH)

(72) Inventors: Silvia Bartolucci, London (GB); Pauline Bernat, London (GB)

(73) Assignee: nChain Licensing AG, Zug (CH)

( * ) Notice: Subject to any disclaimer, the term of this patent is extended or adjusted under 35 U.S.C. 154(b) by 103 days.

(21) Appl. No.: 16/979,145

(22) PCT Filed: Mar. 5, 2019

(86) PCT No.: PCT/IB2019/051763
§ 371 (c)(1),
(2) Date: Sep. 8, 2020

(87) PCT Pub. No.: WO2019/171269
PCT Pub. Date: Sep. 12, 2019

(65) Prior Publication Data
US 2020/0412542 A1    Dec. 31, 2020

(30) Foreign Application Priority Data
Mar. 8, 2018 (GB) ..................... 1803706

(51) Int. Cl.
*H04L 29/06* (2006.01)
*H04L 9/32* (2006.01)
(Continued)

(52) U.S. Cl.
CPC .......... *H04L 9/3236* (2013.01); *H04L 9/3066* (2013.01); *H04L 9/50* (2022.05); *H04L 2209/56* (2013.01)

(58) Field of Classification Search
CPC ....... H04L 9/3236; H04L 9/3066; H04L 9/50; H04L 2209/56; H04L 9/3218
See application file for complete search history.

(56) References Cited

U.S. PATENT DOCUMENTS

| 7,958,356 | B1 | 6/2011 | Subramanian et al. |
| 10,218,511 | B2 * | 2/2019 | Campagna ............ H04L 9/0643 |

(Continued)

FOREIGN PATENT DOCUMENTS

| EP | 2363977 A1 | 9/2011 |
| JP | 2012216916 A | 11/2012 |

(Continued)

OTHER PUBLICATIONS

Antonopoulos "Mastering Bitcoin. Unlocking Digital Cryptocurrencies", O'Reilly Media, Apr. 2014 (Year: 2014).*

(Continued)

*Primary Examiner* — Taghi T Arani
*Assistant Examiner* — Lin Chang
(74) *Attorney, Agent, or Firm* — Davis Wright Tremaine LLP

(57) ABSTRACT

The invention relates to distributed ledger technologies such as consensus-based blockchains. Computer-implemented methods for locking and unlocking transaction inputs and outputs are described. The invention is implemented using a blockchain network, which may be, for example, a Bitcoin blockchain. A group of entities form a group in with membership may be proven using an accumulation tree. A variety of methods are described for generating the accumulation tree, including methods that use a central authority and methods that use a decentralized protocol in place of the central authority. In various implementations, parties are able to unlock transaction outputs that are based on group membership without revealing their identity generally.

17 Claims, 11 Drawing Sheets

(51) Int. Cl.
  *H04L 9/30* (2006.01)
  *H04L 9/00* (2022.01)

(56) References Cited

U.S. PATENT DOCUMENTS

| | | | | |
|---|---|---|---|---|
| 2005/0114666 | A1* | 5/2005 | Sudia | G06F 21/645 |
| | | | | 713/175 |
| 2013/0097519 | A1* | 4/2013 | Andersson | G06F 40/103 |
| | | | | 715/744 |
| 2013/0238522 | A1* | 9/2013 | Rho | G06Q 10/06398 |
| | | | | 705/348 |
| 2015/0213433 | A1 | 7/2015 | Khan | |
| 2017/0019382 | A1* | 1/2017 | Jain | H04L 63/06 |
| 2017/0033932 | A1* | 2/2017 | Truu | H04L 63/102 |
| 2017/0091726 | A1* | 3/2017 | Morgan | G06Q 20/065 |
| 2018/0183592 | A1* | 6/2018 | Campagna | H04L 9/30 |
| 2018/0232648 | A1* | 8/2018 | Acharya | G06Q 30/02 |
| 2018/0331832 | A1* | 11/2018 | Pulsifer | G06Q 20/065 |
| 2019/0363892 | A1* | 11/2019 | Wang | H04L 9/3236 |

FOREIGN PATENT DOCUMENTS

| | | | |
|---|---|---|---|
| KR | 100828125 | * | 5/2008 |
| WO | 2017145010 | A1 | 8/2017 |

OTHER PUBLICATIONS

Antonopoulos, "Mastering Bitcoin—Unlocking Digital Cryptocurrencies," O'Reilly Media, Inc., Dec. 20, 2014, 282 pages.

Camenisch et al., "Efficient revocation of anonymous group membership certicates and anonymous credentials," Cryptology ePrint Archive, Dec. 24, 2001, 14 pages.

Garman et al., "Decentralized Anonymous Credentials," Oct. 15, 2013, https://eprint.iacr.org/2013/622.pdf, 21 pages.

Ghosh et al., "Zero-Knowledge Accomulators and Set Operations," IACR Cryptology, 2015, 46 pages.

Johoe et al., "Can dynamic accumulators be used to store UTXOs," Bitcoin Forum, https://bitcointalk.org/index.php?topic=1064860.0, May 18, 2015 [retrieved Jul. 12, 2018], 8 pages.

Miers et al., "Zerocoin: Anonymous Distributed E-Cash from Bitcoin," IEEE Symposium on Security and Privacy, May 19-22, 2013, 15 pages.

Nakamoto, "Bitcoin: A Peer-to-Peer Electronic Cash System," Bitcoin, Oct. 31, 2008, https://bitcoin.org/bitcoin.pdf, 9 pages.

Reyzin et al., "Efficient Asynchronous Accumulators for Distributed PKI," International Conference on Security and Cryptography for Networks, Aug. 11, 2016, 18 pages.

Satoshi et al., "Connection Limits," Bitcoin Forum, Aug. 9, 2010, https://bitcointalk.org/index.php?topic=741.0;prev_next=prev, 2 pages.

UK Commercial Search Report dated Jul. 13, 2018, Patent Application No. GB1803706.9, 7 pages.

UK IPO Search Report dated Aug. 31, 2018, Patent Application No. GB1803706.9, 5 pages.

Inamura et al., "A New Tree-Structure-Specified Multisignature Scheme for a Document Circulation System", In Proceedings of the International Conference on Security and Cyprography, 2011, 8 pages.

Andreas M. Antonopoulos, Bitcoin and Blockchain; Technique SupportingCryptocurrency, Jul. 21, 2016, NTT publication, Document describing a well-known technique), 32 pages.

* cited by examiner

Information Made Public

Secret Share Construction

Secret Reconstruction and
Tree Data Exchange

BLOCKCHAIN-IMPLEMENTED METHODS AND SYSTEMS FOR AUTHORISATION BASED ON BILINEAR MAP ACCUMULATORS

FIELD OF INVENTION

This invention relates generally to authorisations relating to the transfer of digital assets via a blockchain and, more particularly, to authorise the transfer of digital assets based on a proof of group membership. The invention is particularly suited but not limited to the creation of Bitcoin Scripts that authorize the transfer of digital assets based at least in part on membership in a group or subgroup. The invention provides cryptographic solutions for blockchain-implemented authorisations and permission-based control operations. Solutions provide by the invention are computationally efficient while preserving security.

BACKGROUND OF INVENTION

In this document the term "blockchain" refers to any of several types of electronic, computer-based, distributed ledgers. These include consensus-based blockchain and transaction-chain technologies, permissioned and unpermissioned ledgers, shared ledgers and variations thereof. The most widely known application of blockchain technology is the Bitcoin ledger, although other blockchain implementations have been proposed and developed. While the example of Bitcoin may be referred to in the present disclosure, for the purpose of convenience and illustration it should be noted that the invention is not limited to use with the Bitcoin blockchain, and alternative blockchain implementations and protocols fall within the scope of the present invention. For example, the invention can be useful in other blockchain implementations that have limitations similar to Bitcoin regarding what constraints can be encoded within transactions. The term "Bitcoin" is used herein to refer to any variation or version deriving from the Bitcoin protocol.

A blockchain is a peer-to-peer, electronic ledger that is implemented as a computer-based decentralised, distributed system made up of blocks which, in turn, are made up of transactions and other information. For example, with Bitcoin each transaction is a data structure that encodes the transfer of control of a digital asset between participants in the blockchain system and includes at least one input and at least one output. In some embodiments, a "digital asset" refers to binary data that is associated with a right to use. Examples of digital assets include Bitcoin, ether, and Litecoins. In some implementations, transferring control of a digital asset can be performed by reassociating at least a portion of a digital asset from a first entity to a second entity. Each block contains a hash of the previous block so that blocks become chained together to create a permanent, immutable record of all transactions that have been written to the blockchain since its inception. Transactions contain small programs known as scripts embedded into their inputs and outputs that specify how and by whom the outputs of the transactions can be accessed. On the Bitcoin platform, these scripts are written using a stack-based scripting language.

That is, the stack-based scripting language may utilize a data structure called a stack. With the stack, values can be pushed onto the stack or popped from the stack. Various operations performed to the stack can result in pushing or popping one or more of the values from the top of the stack. For example, an OP_EQUAL operation pops the top two items from the stack, compares them, and pushes a result (e.g., 1 if equal or 0 if unequal) onto the stack. In some scripting languages employed by some of the present embodiments, there may be at least two stacks: a main stack and an alternate stack. Some operations of the scripting language can move items from the top of one stack to the top of another stack. For example, OP_TOALTSTACK moves a value from the top of the main stack to the top of the alternate stack.

In order for a transaction to be written to the blockchain, it must be "validated". Network nodes (miners) perform work to ensure that each transaction is valid, with invalid transactions rejected from the network. A node can have standards for validity different from other nodes. Because validity in the blockchain is consensus-based, a transaction is considered valid if a majority of nodes agree that a transaction is valid. Software clients installed on the nodes perform this validation work on transactions referencing an unspent transaction (UTXO) in part by executing the UTXO locking and unlocking scripts. If execution of the locking and unlocking scripts evaluates to TRUE and other validation conditions, if applicable, are met, the transaction is validated by the node. The validated transaction is propagated to other network nodes, whereupon a miner node can select to include the transaction in a blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e., added to the public ledger of past transactions. The transaction is considered to be confirmed when a sufficient number of blocks is added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the blockchain to implement new systems. It would be highly advantageous if the blockchain could be used for automated tasks and processes which are not limited to the realm of cryptocurrency. Such solutions would be able to harness the benefits of the blockchain (e.g., a permanent, tamper proof record of events, distributed processing, etc.) while being more versatile in their applications.

A blockchain transaction output includes a locking script and information regarding ownership of digital assets such as Bitcoins. The locking script, which may also be referred to as an encumbrance, "locks" the digital assets by specifying conditions that are required to be met in order to spend the output. For example, a locking script could require that certain data be provided in an unlocking script to unlock the associated digital assets. The locking script is also known as "scriptPubKey" in Bitcoin. A technique for requiring a party to provide data to unlock a digital asset involves embedding a hash of the data inside the locking script. However, this presents a problem if the data is undetermined (e.g., not known and fixed) at the time the locking script is created.

SUMMARY OF INVENTION

Thus, it is desirable to provide methods and systems that improve blockchain technology in one or more of these aspects. Such an improved solution has now been devised. Thus, in accordance with the present invention there is provided a method as defined in the appended claims.

Thus, it is desirable to provide a computer-implemented method, the computer-implemented method comprising:

generating a digest of an accumulation tree, elements of the accumulation tree representing a set of computer systems; generating a record for insertion into a distributed data structure, the record containing authorization information that is based at least in part on the digest; and causing the record to be inserted into the distributed data structure.

Preferably, the computer-implemented method claimed may be an embodiment where the record includes a locking script, and the authorization information identifies a hash of a local digest of the accumulation tree.

Preferably, the computer-implemented method may be an embodiment where the record includes an unlocking script, and the authorization information identifies a number derived from the local digest represented by a point on the elliptic curve.

Preferably, the computer-implemented method may be an embodiment where the record includes an unlocking script, and the authorization information identifies a number derived from the global digest represented by a point on the elliptic curve.

Preferably, the computer-implemented method may be an embodiment where a structure of the accumulation tree is determined based at least in part on an organisational structure associated with the set of computer systems.

Preferably, the computer-implemented method may be an embodiment where a set of tree parameters are negotiated amongst the set of computer systems, the set of tree parameters including a tree depth and a number of child nodes per intermediate node, and the accumulation tree is constructed in accordance with the set of tree parameters.

Preferably, the computer-implemented method may be an embodiment where the set of computer systems share information with each other that allows each computer system to reconstruct a common secret and a global digest of the accumulation tree.

Preferably, the computer-implemented method may be an embodiment where: a subset of the set of computer systems share information of the subset with other members of the subset so that members of the subset are able to determine a local digest for the subset; and computer systems that are in the set of computer systems and not in the subset are not provided with the information and are unable to determine the local digest.

Preferably, the computer-implemented method may be an embodiment where the computer systems that are in the set of computer systems and not in the subset are provided with a hash of a digest of a parent node of the subset of computer systems.

Preferably, the computer-implemented method may further comprise generating a witness that, in combination with the digest, proves membership in a set of computer systems.

Preferably, the computer-implemented method may be an embodiment where membership in set of computer systems is determined by via an authoritative computer system, and the authoritative computer system establishes, amongst the set of computer systems, a shared set of parameters associated with the accumulation tree.

Preferably, the computer-implemented method may be an embodiment where each computer system in the set of computer systems shares a hash of a credential of the computer system with other members of the set so that each member of the set is able to determine a global digest of the accumulation tree.

Preferably, the computer-implemented method may be an embodiment where the distributed data structure is a blockchain, and the record is a Bitcoin transaction record.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of execution by one or more processors of a computer system, cause the computer system to at least perform any of the methods as claimed.

The invention can be described as a verification method/system, and/or as a control method/system for controlling the exchange or transfer of a digital asset via a blockchain. In some embodiments, the digital asset is a token or a portion of cryptocurrency. As explained below, the invention can also be described as a secure method/system for new, improved and advantageous ways of performing operations via a blockchain network or platform.

BRIEF DESCRIPTION OF THE DRAWINGS

These and other aspects of the present invention will be apparent from and elucidated with reference to the embodiment described herein. An embodiment of the present invention will now be described, by way of example only and with reference to the accompanying drawings, in which.

DETAILED DESCRIPTION

Figure 1:
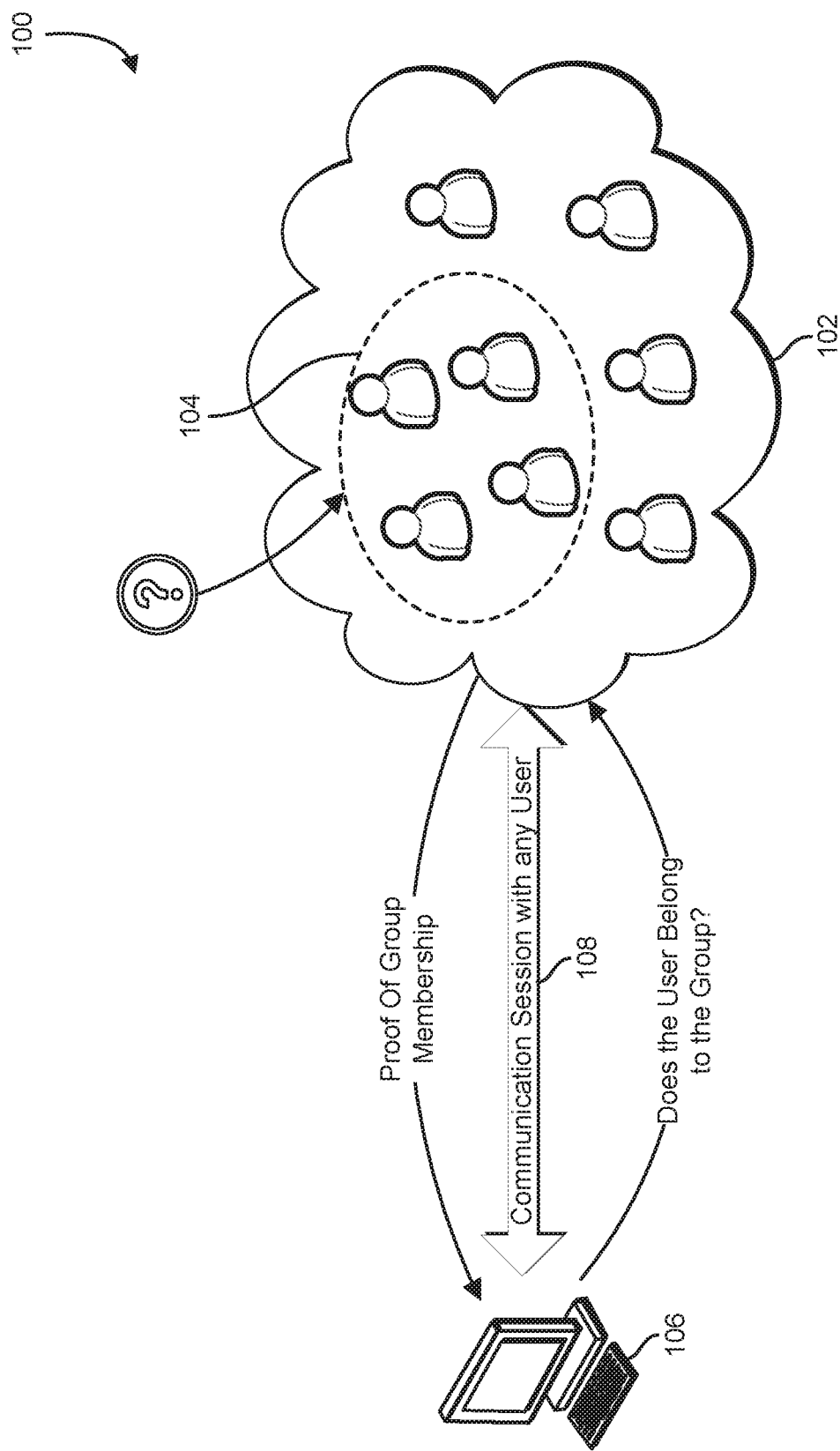
FIG. 1 illustrates an example of a system in which authentication of a particular user is accomplished by the user providing proof that the user is a member of a group, in an embodiment.

The present document describes a computer system that enables authorization of an operation based at least in part on a party to the operation proving membership in a group. In some embodiments, the system embeds the set membership requirements into authorization data, such as a locking script of a distributed blockchain data structure. For example, techniques described and suggested herein can be applied to facilitate the addition of group membership requirements into cryptocurrency transactions such as Bitcoin transactions. In various embodiments, users are able to obtain and prove membership to a group and authorize transactions on a blockchain network using a solution based on bilinear map accumulators. In anonymous protocols using electronic authentication systems, it is often desirable to disclose as little information as possible during the authorization process. One type of efficient e-authentication solution is based on accumulators. Such cryptographic primitives allow the creation of computationally efficient and privacy-preserving proofs of membership.

In various embodiments, a set of users may securely compute their proof of membership using a centralised protocol or a decentralised protocol. In the centralised protocol, users wishing to obtain membership to a group may communicate with a central authority. In the distributed protocol, users collaborate among themselves to generate their proof of membership. In both protocols, a hierarchical structure, the accumulation tree, is created to efficiently store information about the elements belonging to a given group and compress it in local and global quantities. In various embodiments, group membership is established on behalf of a computer system or an account on a computer system that is associated with a user. For example, a user may be authorized to perform an operation by being a member of an administrators group, but the operation may be authorized by showing that the account associated with the user has been granted membership in the administrators group. The generation and production of a proof of group membership is performed by a computer system operated by the user, or under authority of the user, using the user's account credentials.

With the diffusion of electronic authentication services and devices on the Internet and in the physical world there is an increased demand for secure, privacy-enhancing solutions. For example, in applications such as e-tickets, electronic ID cards, computer authorization, and secure communications, privacy and security are very important. In order to protect the privacy and security of the user, it is desirable to reduce the amount of disclosed information. In general, users should disclose as little personal information as possible in order to authorize a given transaction or process. For example, if in order to authorize a purchase a user has to prove that he or she is over 25 years old, he or she should reveal only information about his or her age and not full date of birth, address, etc. However, currently available systems do not allow the user sufficient control over the particular information revealed, often requiring authentication of the user's identity in order to prove even a single characteristic of the user. For example, in many systems, a user may have to provide a signed certificate that reveals the user's name, address, age, and contact information as part of proving that they are over 25 years old.

The present application describes various embodiments that address this shortcoming by providing improved control over the release of information. For example, methods are described that allow specific pieces of user-related information to be disclosed without disclosing other unrelated information. Using these techniques, the principle of minimizing the amount of user information revealed may be applied to the verification of transactions on a blockchain such as the Bitcoin blockchain. For example, on the Bitcoin blockchain, the transactions are publicly stored on the blockchain ledger, and disclosing excessive amounts of information as part of the transaction locking and unlocking scripts may compromise the privacy of its users. Various embodiments of the techniques described herein may be applied to limit the scope of information revealed when using such scripts, resulting in increased security, improved privacy, and greater anonymity for the user.

Various embodiments of cryptographic solutions based on accumulators may be used in anonymous credential systems and anonymous e-cash protocols to preserve user privacy. Such systems generally rely on three types of entities: certificate issuers, a verifier, and certificate recipients (users). In general, a user obtains from an issuer a signature/proof that they hold certain attributes, and the user can show the proof to demonstrate that the user possesses certain attributes without showing the attributes themselves. If used to unlock or sign cryptocurrency transactions, the above-mentioned techniques increase the anonymity and unlinkability of the transactions because users can determine which portions of a given certificate they want to prove, show, or keep hidden.

Membership in an anonymous group may change over time. For example, certificates may be revoked or new members may want to join the group under certain circumstances. In some embodiments, abusing the certificate may lead to revocation of group membership and the blacklisting of the offending users. In some implementations, a group manager or administrator publishes a list that identifies revoked members or issues certificates that expire after a specified date. However, in the case of anonymous certificates, making public a list of new or revoked members would compromise the privacy of the users.

In various embodiments, the above problem is addressed through the use of zero-knowledge proofs which show that a given user is part of a group or on the list of revoked members without having to reveal the user's identity. In various implementations, additional computational cost associated with the proof may be incurred. An embodiment of zero-knowledge proofs may be constructed based on accumulators as described by Benaloh, J., & De Mare, M. (1993, May). One-way accumulators: A decentralized alternative to digital signatures. In *Workshop on the Theory and Application of Cryptographic Techniques* (pp. 274-285). Springer, Berlin, Heidelberg. Accumulators may be based on prime numbers or on quasi-cumulative hashes where the accumulator maintains a constant size.

As used in the current document, accumulators are defined as a one-way membership function. Accumulators are commitments to a set S of elements and allow one to hash a large set of inputs to a single short value. When a new element s is added to the set, a witness (w) or proof of membership is created for the given element. The witness together with the accumulator value may be used to prove the membership to the group.

In various embodiments, the set of elements S may evolve over time. In some implementations, the accumulator may be recalculated each time there is an update to the set. Therefore, the present document focuses on static accumulators, representing fixed sets of elements. In particular, the present document describes a centralized protocol and a decentralized protocol that allow a set of users to prove membership to a specific group using accumulators. In an embodiment, the proof of group membership may be incorporated into a Bitcoin script to authorize the transfer of a digital asset.

Elliptic curve financial arithmetic is an important part of many blockchain systems such as Bitcoin. For example, public keys in the Bitcoin protocol are calculated from private keys using elliptic curve multiplication. An elliptic curve over the integers modulo p may be described as the set of points described by the equation:

$$y^2 \equiv x^3 ax + b \pmod{p}$$

where $4a^3 + 27b^2 \not\equiv 0 \pmod{p}$ and p is prime.

For the purposes of this document, the elliptic curve arithmetic functionality required inside a Bitcoin Script is that of 'point multiplication by scalar'. This is the operation such that:

$$nP = \underbrace{P \oplus P \oplus \ldots \oplus P}_{n}$$

where n is a natural number, P is a point on the elliptic curve, and $\oplus$ is the operator for addition of points on the elliptic curve.

Scalar multiplication in turn requires the elliptic curve group operations of Point Addition and Point Doubling.

Point Addition $P \oplus Q$: With this operation, a new point on the elliptic curve is computed as a negation of the intersection of the curve. Elsewhere in the present document, point addition may be represented as $R = P \oplus Q$.

Point Doubling $P \oplus P$: Using point addition, a point double of P may be determined. Elsewhere in the present document, point doubling may be described as $R = P \oplus P = 2P$.

For example, given two points, $P(x_1, y_1)$ and $Q(x_2, y_2)$, on the elliptic curve $P \oplus Q = (x_3, y_3)$:

$$x_3 = m^2 - x_1 - x_2 \bmod p$$

$$y_3 = m(x_1 - x_3) - y_1 \bmod p$$

$$m = \begin{cases} \frac{y_2 - y_1}{x_2 - x_1} \bmod p: \text{ if } P \neq Q \text{ (Point Addition)} \\ \frac{3x_1^2 + a}{2y_1} \bmod p: \text{ if } P = Q \text{ (Point Doubling)} \end{cases}$$

In general, a threshold cryptosystem may be characterized by (t; n)—threshold, where n is the number of parties in the system and t+1 is the minimal number of parties required to reconstruct a secret. Secret sharing schemes are examples of threshold cryptosystems whereby a secret k is divided among n parties, such that at least t+1 parties are able to collaborate in order to reconstruct k. As a consequence, in some embodiments, the knowledge of any t (or fewer) pieces of the secret k by a single party or group of parties does not enable the certificate to be reconstructed.

In some embodiments, Shamir's secret sharing ("SSS") may be used to determine a shared secret between two or more parties. SSS is based on polynomial interpolation and without loss of generality ("w.l.o.g.") the secret is assumed to be an element of a finite field $\mathbb{F}_p$ of size p (p prime). The scheme may or may not include a dealer, a set of n participants $U_1, \ldots, U_n$ and an access structure A, i.e., the groups of participants able to reconstruct the secret. In SSS, an arbitrary random secret is stored as $f(0)$ in a t degree polynomial $f(x)$ and only player i can calculate its associated share $f(x_i)$. If t+1 out of n players collaborate, they can reconstruct any point on $f(x)$, with their shares (of the key k) $k_1, k_2, \ldots, k_n$ which correspond to $f(x_1), f(x_2), \ldots, f(x_n)$ using Lagrange Polynomial Interpolation.

Using the Lagrange Polynomial Interpolation, a function $f(x)$ with degree t can be reconstructed with t+1 points as follows:

$$p = \{(x_1, f(x_1)), (x_2, f(x_2)), \ldots, (x_{t+1}, f(x_{t+1}))\}$$

$$f(x) = \sum_{i \in p} f(x_i) \prod_{j \in p, j \neq i} \frac{x - x_j}{x_i - x_j} = \sum_{i \in p} f(x_i) b_{i,p}(x)$$

where $$b_{i,p}(x) = \prod_{j \in p, j \neq i} \frac{x - x_j}{x_i - x_j}.$$

Note that $b_{i,p}(x_i) = 1$ and $b_{i,p}(x_j) = 0$.

In an embodiment where a dealer is present, the dealer selects a secret $a_0 = k$, assumed to be an element of the finite field $\mathbb{F}_p$ of size p (p prime), and randomly picks t−1 positive integers $a_1, \ldots, a_{t-1}$, which represent the coefficient of the polynomial $f(x) = a_0 + a_1 x + a_2 x^2 + \ldots$ The dealer then computes n points $(x_i, f(x_i))$ belonging to the polynomial and distributes it to the participants.

In an embodiment where a dealer is not present, in the dealer-less shares distribution phase:
1. Each player $U_i$ is assigned $x_i$ which is known by everyone. Each $x_i$ is unique.
2. Each player $U_i$ generates a random polynomial $f_i(x)$ with degree t.
3. Each player $U_i$ secretly sends every other player their respective point on the polynomial, $f_i(x_j) \bmod n$. In an embodiment, u, may be secretly sent by encrypting $U_i$ with a recipient's public key and then transmitting the encrypted version of $U_i$ to the recipient.
4. Each player $U_i$ sums all their received $f_1(x_i), f_2(x_i), \ldots f_p(x_i)$ (all mod n, where n is the order of the group generated by the point G on the elliptic curve) to form:

$$k_i = f(x_i) \bmod n$$

which is a share on the polynomial $f(x) \bmod n$.

In various embodiments, an additional element of the threshold signature calculations is the determination of $k \times G$ where k is the secret key and G is a point on the elliptic curve. If $f(x)$ is a t-degree polynomial, secret k can be interpolated by $k = \sum_{i \in \pi} b_i, \pi k_i$ where $\pi$ is a size t+1 subset of shares $k_a, k_b, \ldots, k_t, k_{t+1}$ and b is an interpolating factor. $\pi$ is a group of t+1 players collaborating to calculate $k \times G$ without revealing their share $k_i$. k is the x=0 point on a t-degree polynomial Each player $U_i$ calculates a part $b_{i,\pi} k_i \times G$ The players in p: add their part together (reconstructing the secret k via Lagrange interpolation) giving:

$$b_{a,\pi} k_a \times G + b_{b,\pi} k_b \times G + \ldots + b_{t+1,\pi} k_{t+1} \times G = k \times G$$

In the present document, the process of calculating $Q = kG$ may be referred to as Secret Share Joining.

In various embodiments, bilinear pairings and bilinear-map accumulators may be used. Let $G_1, G_2$ be two cyclic multiplicative groups of prime order p with generators $g_1, g_2$. We assume that there exists an isomorphism $\phi: G_2 \rightarrow G_1$ such that $\phi(g_2) = g_1$. Given $G_M$, a cyclic multiplicative group of order p, a bilinear pairing can be defined as e: $G_1 \times G_2 \rightarrow G_M$ with the following properties:
1. Bilinearity: $e(P^a, Q^b) = e(p, Q)^{ab} \forall p \in G_1, Q \in G_2$ and $a, b \in \mathbb{Z}_p$.

2. Non-degeneracy: $(g_1,g_2) \neq 1$.
3. Computability: there exists an efficient algorithm to compute $e(P,Q) \forall P \in G_1, Q \in G_2$.

In the following example, we will set $G_1 = G_2 = G$ and $g_{i=g_2} = g$ and we will consider the pairing $$e: G \times G \rightarrow G_M.$$

In an embodiment, the bilinear-map accumulator based on the bilinear pairings can accumulate a set of n elements $E = (e_1, \ldots, e_n) \in G$ in the accumulation value $f(E) = g^{(e_1'+s)(e_2'+s)\ldots(e_n'+s)}$. The accumulation value is an element in G and it accumulates elements in $\mathbb{Z}_p^*$. The elements $(e_1', e_2', \ldots, e_n') \in G$ are a cryptographic hash of the original element of the set $E = (e_1, \ldots, e_n) \in G$, i.e. $e_i' = h(e_i)$ with h: $G \rightarrow \mathbb{Z}_p^*$. h: $G \rightarrow \mathbb{Z}_p^*$ is a collision-resistant hash function taking as inputs elements of the multiplicative cyclic group G and producing as outputs integers in $\mathbb{Z}_p^*$. s represents the trapdoor information that is kept secret.

In an embodiment, an accumulation tree is used to store the data using authenticated data structures, and a primitive offering constant time updates and constant size proofs. Although other types of storage schemes may be used, the use of an accumulation tree may have the advantage of reducing the communication and verification costs as well as reducing the storage costs.

In the following example, the accumulation tree is used to verify the correctness of the hash values for the subsets involved in the query: the public tree digest (a succinct representation of a set of elements) for the set guarantees the hash values and, in turn, the hash values validate the set.

The accumulation tree is denoted as $T(\varepsilon)$ with $0 < \varepsilon < 1$. $T(\varepsilon)$ represents a rooted tree with n leaves where the n elements of the set E are stored. The number of levels in the tree are defined as $$l = \left\lceil \frac{1}{\varepsilon} \right\rceil$$

while the number of children nodes per node is $O(n^\varepsilon)$. The leaves (or set elements) are at the same level identified with level 0.

Figure 2:
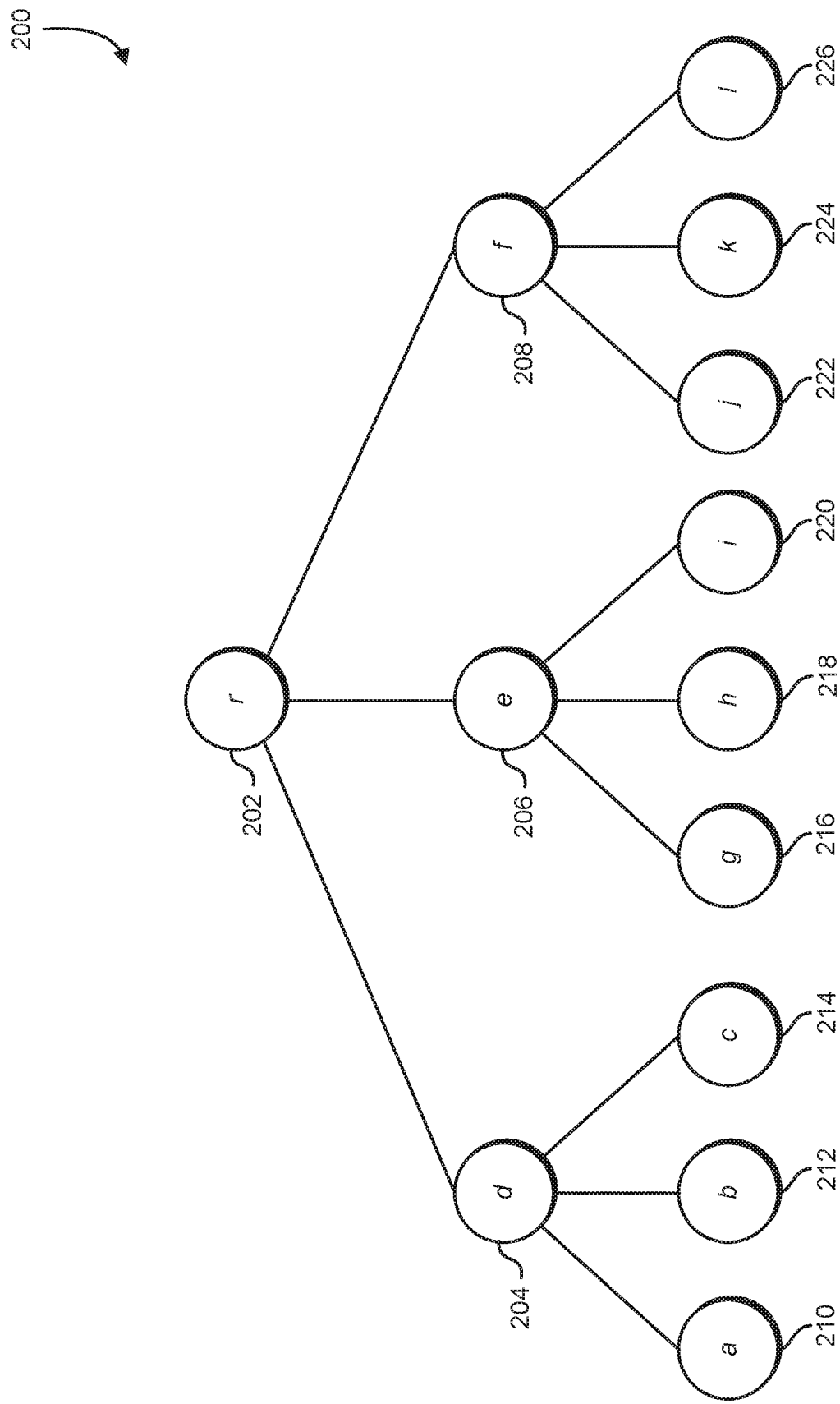
FIG. 2 illustrates an example of an accumulation tree for a set of nine elements, in an embodiment.

FIG. 2 illustrates an example of an accumulation tree $T(\varepsilon)$ 200 for a set of 9 elements, in an embodiment. In the example shown, the accumulation tree has 9 elements and 3 levels, and each internal node has three child nodes. In the illustrated example, the accumulation tree has a root node r 202. The root node r 202 has three child nodes: a first intermediate node d 204, a second intermediate node e 206, and the third intermediate node $f$ 208. Each of the three intermediate nodes has three child nodes, each of which are leaf nodes of the accumulation tree. The first intermediate node d 204 has a first child node a 210, a second child node b 212, and a third child node c 214. The second intermediate node e 206 has a first child node g 216, a second child node h 218, and a third child node i 220. The third intermediate node $f$ 208 has a first child node j 222, a second child node k 224, and a third child node l 226.

For every leaf node v in the accumulation tree $T(\varepsilon)$ 200 that stores an element $e \in [e_1, \ldots, e_9]$, we define the accumulation value $\psi(v)$ as equal to the value of the element itself:

$$\psi(v) = e$$

For every non-leaf node v in the accumulation tree $T(\varepsilon)$ 200 that lies in the levels $1 \leq i \leq l$ (here l=2) we define the accumulation as follows:

$$\psi(v) = g^{\prod_{u \in C(v)}(h(\psi(u))+s)}$$

where $C(v)$ is the set of children of nodes v, and $\psi(u)$ is the bilinear local digest of node u. For example, for the accumulation tree $T(\varepsilon)$ 200 in FIG. 2 $C(v=d) = \{a,b,c\}$. s is the trapdoor of the scheme, and h: $G \rightarrow \mathbb{Z}_p^*$ is a collision-resistant hash function.

For a given element x belonging to the set E the proof of membership $\pi(x)$ comprises an ordered sequence of proofs, one per layer of the accumulation tree $\pi(x) = \{\pi_i, i=1, \ldots, l\}$.

Each element of the proof corresponds to the pair composed by a local digest $\alpha_i$ and a branch witness $\beta_i$ of the element per level:

$$\pi_i = (\alpha_i, \beta_i), i=1, \ldots, l$$

For a given layer i with $1 \leq i \leq l$ we have:

$$\alpha_i = \psi(v_{i-1})$$

$$\beta_i = g^{\prod_{u \in S(v-1)}(h(\psi(u))+s)}$$

where $S(v_i)$ corresponds to the set of siblings of node $v_i$ in the tree $T(\varepsilon)$. For example, for the accumulation tree in FIG. 1 the set of siblings is $S(v=d) = \{e,f\}$.

For a given layer i, the corresponding proof element comprises two components:
- $\alpha_i$ that represents the bilinear digest of the node in the previous layer (layer i−1) found in the path of nodes $P(x): x \rightarrow r$ linking the element x to the root node r. For a layer $1 < i < l$, $\alpha_i$ is the same for all the elements present in the layer i−1.
- $\beta_i$ that represents the "branch witness", a witness that authenticates the missing node of the path from the queried node to the root of the tree.

In various embodiments, the proof is computed by a trusted party and sent to a user/prover, and the trapdoor information s is unknown to the prover. However, the quantities $g^s, g^{s^2} \ldots g^{s^n}$ are made public in some embodiments by the third party.

The global bilinear digest of the whole accumulation tree is:

$$d = \psi(r)$$

where $$\psi(r) = g^{(h(\psi(d))+s)(h(\psi(e))+s)(h(\psi(f))+s)}$$

and r indicates the root of the tree.

In an embodiment, the user provides its proof $\pi(x)$ to a verifier that verifies the proof. In an embodiment where $g^s$ has been made public, the verifier performs the following operations:
1. The verifier checks that $\alpha_1 = x$;
2. for $i=2 \ldots, l$ the verifier verifies that $e(\alpha_i, g) = e(\beta_{i-1}, g^{s+h(\alpha_{i-1})})$.

Using the bilinear mapping property, the second relation may also be expressed as verifying the following equality:

$$\alpha_i = \beta_{i-1}^{s+h(\alpha_{i-1})}, \forall i=2, \ldots, l.$$

In an embodiment, the proof is accepted by the verifier if the above relations hold.

In various embodiments, the proof may be constructed using centralised protocol or a decentralised protocol. In various examples, proof of membership (or part of the proof of membership) based on a bilinear-map accumulator is used to verify transactions on a blockchain network.

The present document describes a centralised and a decentralised version of a protocol that uses bilinear map accumulators. The following examples illustrate the protocol by way of example, the examples having a number of elements stored in the accumulation tree and parameters for the elliptic curve and prime field.

In an embodiment, an accumulation tree is used to construct proofs and verify membership of a set of elements. The accumulation tree can be used to store compressed information and the digest of the accumulation tree can be used to lock bitcoin UTXO, which is redeemable by any participant able to prove the knowledge of an element in the tree or in a subpart of the tree.

Figure 3:
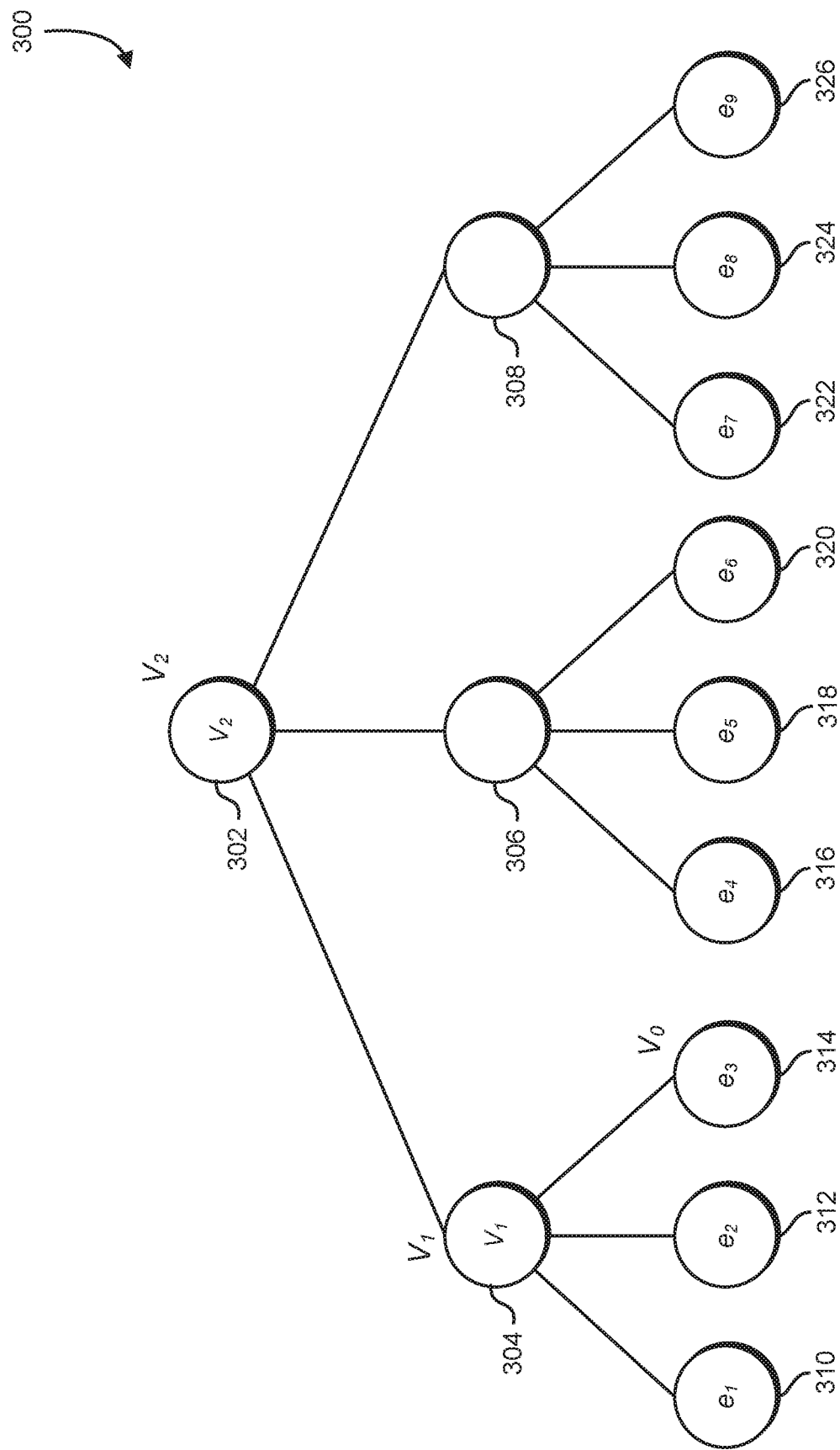
FIG. 3 illustrates an example of an accumulation tree where each element has an associated element $e_i$ for i=1 . . . 9, in an embodiment.

FIG. 3 illustrates an example of an accumulation tree 300 where each element has an associated element $e_i$ for $i=1 \ldots 9$, in an embodiment. In the example shown, the accumulation tree has 9 elements and 3 levels, and each internal node has three child nodes. In the illustrated example, the accumulation tree has a root node $V_2$ 302. The root node $V_2$ 302 has three child nodes: a first intermediate node $V_1$ 304, a second intermediate node 306, and the third intermediate node 308. Each of the three intermediate nodes has three child nodes, each of which is a leaf node of the accumulation tree. The first intermediate node $V_1$ 304 has a first child node $e_1$ 310, a second child node $e_2$ 312, and a third child node $V_3$ 314. The second intermediate node 306 has a first child node $e_4$ 316, a second child node $e_5$ 318, and a third child node $e_6$ 320. The third intermediate node 308 has a first child node $e_7$ 322, a second child node $e_8$ 324, and a third child node $e_9$ 326.

In the example illustrated in FIG. 3, the accumulation tree 300 comprises nine elements, $[e_1, \ldots, e_9]$. In the following examples, we consider that each element's value is known by only one individual, and therefore the tree represents nine individuals knowing the value of one element each.

In the following example, we demonstrate how to prove the existence of the third child node $V_0$ 314 in the accumulation tree 300: $x=e_3$. We define the path $P(x)$ from x (third child node $V_0$ 314) to the root (root node $V_2$ 302): $P(x)$: $v_0 \to v_1 \to v_2$ as illustrated in FIG. 3.

In this example, for the purposes of explanation, instead of using the elliptic curve as defined in the Bitcoin protocol, we choose a different set of parameters to perform our computation with human-readable numbers. Those skilled in the art will appreciate that other elliptic curve parameters may be used in other implementations. For this example, we use the following elliptic curve defined over a prime field $\mathbb{F}_p$ (where p is a prime number):

$$y^2 = x^3 + ax^2 + b$$

where $$a = -7, b = 10$$

and $$p = 97$$

Since the points of an elliptic curve defined over a prime field $\mathbb{F}_p$ are generators of the curve, we choose the generator g for our example to be $g=(1,2)$. We choose the secret (trapdoor information) to be $s=66$. The hash function $h: \mathbb{G} \to \mathbb{Z}_p^*$ we choose to use for this demonstration is the following:

$$h:(x,y) \to x + 2^k y \pmod{p}$$

Such that $2^k > p$. The above encoding offers a unique solution in $\mathbb{Z}_p^*$ for each point $(x,y)$ on an elliptic curve defined modulo p when using large prime numbers. Since for the purpose of this example we choose a small prime number ($p=97$), this hashing function is not collision-resistant, i.e, the probability of two points in our elliptic curve to have the same hash is not negligible. In other implementations larger prime numbers may be used and are preferred. We choose $k=7$, such that $2^k = 128 > p = 97$.

In this example, we use the following notation for the hash of any element (point in the curve): $h(e) = e'$ $\forall$ e: (x,y), and we choose for the set of elements $[e_1, \ldots, e_9]$ the following set of points on the Elliptic Curve defined above:

| Element | $e_1$ | $e_2$ | $e_3$ | $e_4$ | $e_5$ | $e_6$ | $e_7$ | $e_8$ | $e_9$ |
|---|---|---|---|---|---|---|---|---|---|
| Value (e) | (81, 10) | (3, 4) | (9, 26) | (73, 15) | (95, 4) | (31, 22) | (54, 76) | (19, 25) | (5, 10) |
| Hash (e') | 3 | 30 | 39 | 53 | 25 | 34 | 82 | 18 | 24 |

In the following examples, we describe how a participant can compute the values in Table 2 (points on the elliptic curve) for the proof of membership of an element x, together with the global digest of the accumulation tree:

| $\psi(r) = (40, 96)$ | |
|---|---|
| Proof components | Values (EC points) |
| $\alpha_1$ | (9, 26) |
| $\beta_1$ | (11, 87) |
| $\alpha_2$ | (75, 34) |
| $\beta_2$ | (36, 57) |

The above table shows the values of the components of the proof $\pi(x)$ when $x=e_3=(9,26)$. The set of information given to a participant to compute the participant's proof and the digest of the accumulation tree may be different when implementing a centralised vs a decentralised protocol. Therefore, the centralised protocol and decentralised protocol are described separately below.

Figure 4:
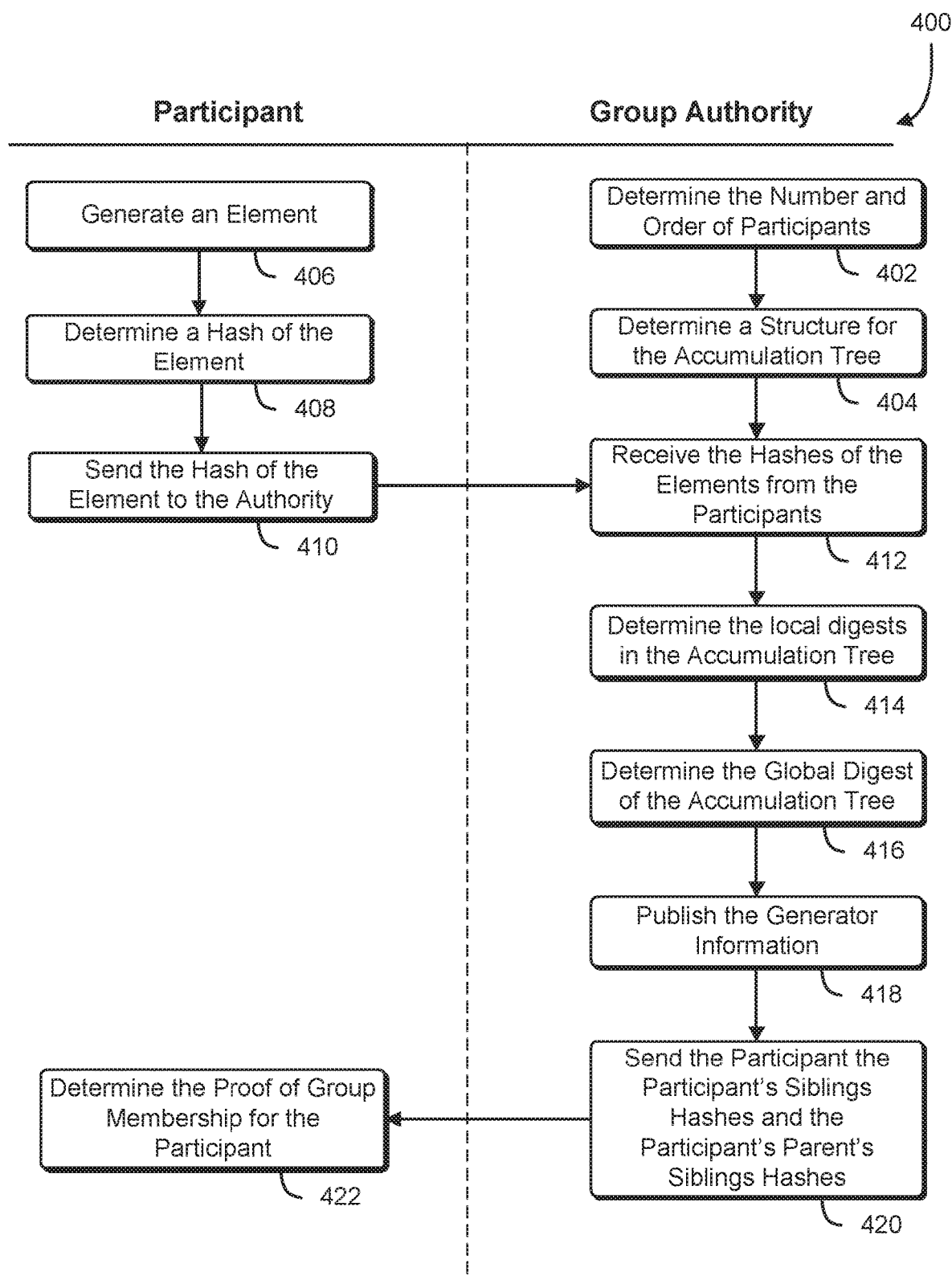
FIG. 4 illustrates an example of a process that, as a result of being performed by a participant and a group authority, allows the participant to generate a proof of group membership, in an embodiment.

FIG. 4 illustrates an example of a process 400 that, as a result of being performed by a participant and a group authority, allows the participant to generate a proof of group membership, in an embodiment. In the embodiments described below, centralised versions of the protocol are described. In the centralized version of the protocol, there exists an Authority taken by an individual or an entity that is responsible for choosing the trapdoor information (secret s) in the bilinear mapping and distributing the necessary pieces of information to participants 'owning' an element in the tree (elements are represented as the leaves of the accumulation tree). In the present document, an entity, participant, party, or other actor may be implemented as a computer system, computer server, server cluster, mobile device, cell phone, or computing appliance containing executable instructions stored in memory. The executable instructions, as a result of being read and executed by a processor on the device, implement the services, functions, or algorithms described herein.

In an embodiment, the Authority determines 402 the order of n participants (order of elements in the tree), $U_1, U_2, \ldots, U_n$, as well as the structure 404 of the tree (e.g., number of levels l, number of child nodes per node, etc.). The Authority also determines the collision-resistant hashing function h: $\mathbb{G} \to \mathbb{Z}_p^*$ to use in the protocol, as well as the parameters for the elliptic curve $t=(a,b,p,g,\mathbb{G})$, and may make this information publicly available. In various implementations, the information may be made publicly available by broadcasting information over a computer network, or by publishing the information via a web service such as a website or web-based service.

In an embodiment, each individual participant generates 406 an element $e_n$ that is generally not shared with the other participants. Each individual participant hashes 408 the individual participant's respective element. By hashing their respective elements $[e_1, \ldots, e_9]$, the participants obtain the values $[e_1', \ldots, e_9']$ (shown in the above table) and send 410 the obtained hash values to the Authority. The value of an element $e_i$ is only known by one participant $U_i$ which sends the hash $e_i'$ to the Authority.

In an embodiment, after receiving 412 the hashes of the elements from the participants, the Authority computes local digests 414 in the tree, in the intermediate layers (l=1 in this example), as well as the global digest 416 and communicates the relevant information to each participant, based at least in part on the position of the participant's respective element in the tree.

In an embodiment, the Authority computes the digest without knowing the value of the elements (in general, it is provided only with the hashes produced using a collision-resistant hash function) and the participants determine the digest without knowing either the value of the other participant's elements (except their own) nor the complete structure of the tree.

In an embodiment, the Authority publishes $g^s, g^{s^2}, \ldots, g^{s^n}$ where n is the number of children in a node (in the penultimate layer of the tree l=1), (n=3 in this example). Given the parameters chosen above for the generator g and the secret s, the following points on the elliptic curve are found:

| Point on elliptic curve | Value (coordinates) |
| --- | --- |
| g | (1, 2) |
| $g^s$ | (63, 36) |
| $g^{s^2}$ | (37, 35) |
| $g^{s^3}$ | (75, 63) |

In an embodiment, the Authority communicates individually with a participant in possession of one element ($e_3$ in this example), sending 420 the following information:
The hashes of the participant's siblings, i.e, $e_1'$ and $e_2'$ in this example
The hashes of participant's parent's siblings, i.e. $\psi'(e)$ and $\psi'(f)$ in this example In an embodiment, a particular participant is capable of determining a proof 422 using the information received from the Authority as follows:
The first element of the proof is:

$$\pi_1 = (\alpha_1, \beta_1) \text{ where}$$

$$\alpha_1 = \psi(v_0) = \psi(e_3)$$

$$\alpha_1 = (9, 26) \text{ and}$$

$$\beta_1 = g^{\prod_{u \in s(v_0)}(h(\psi(u))+s)}$$

$$\beta_1 = g^{(h(\psi(e_1))+s)(h(\psi(e_2))+s)}$$

$$\beta_1 = g^{(h(e_1)+s)(h(e_2)+s)}$$

$$\beta_1 = g^{(e_1'e_2'+s[e_1'+e_2']+s^2)}$$

The above equation can be rewritten in a form that is more suitable for elliptic curve arithmetic:

$$\beta_1 = s^2 \otimes g \oplus ([e_1'+e_2'] \times s) \otimes g \oplus [e_1' \times e_2'] \otimes g$$

where $\otimes$ symbolises the multiplication of a point on the elliptic curve by a scalar and $\oplus$ represents the addition of two points on the Elliptic Curve.

Using the values listed in the above table we can compute the value of witness $\beta_1$ as follows:

$$\beta_1 = (37,35) \oplus [3+30] \otimes (63,36) \oplus [30 \times 3] \otimes (1,2)$$

$$\beta_1 = (37,35) \oplus (31,75) \oplus (53,3)$$

$$\beta_1 = (95,93) \oplus (53,3)$$

$$\beta_1 = (11,87)$$

The second element of the proof is given by:

$$\pi_2 = (\alpha_2, \beta_2)$$

where $$\alpha_2 = \psi(v_1)$$

$$\alpha_2 = g^{(h(e1)+s)(h(e2)+s)(h(e3)+s)}$$

$$\alpha_2 = g^{(e1'+s)(e2'+s)(e3's)}$$

$$\alpha_2 = g^{(e1'e2'e3'+s[e1'e2'+e1'e3'+e2'e3']+s^2[e1'+e2'+e3']+s^3)}$$

The element $\alpha_2$ can be rewritten using the bilinear mapping properties described above as $$\alpha_2 = \beta_1^{(e3'+s)}$$

Using the values listed in the above table, the participant can compute the value of the local digest $\alpha_2$ as follows:

$$\alpha_2 = s^3 \otimes g \oplus ([e_1'+e_2'+e_3'] \times s^2) \otimes g \oplus ([e_1' \times e_2' + e_1' \times e_3' + e_2' \times e_3'] \times s) \otimes g \oplus [e_1' \times e_2' \times e_3'] \otimes g$$

$$\alpha_2 = (75,63) \oplus [3+30+39] \otimes (37,35) \oplus [3 \times 30 + 3 \times 39 + 30 \times 39] \otimes (63,36) \oplus [3 \times 30 \times 39] \otimes (1,2)$$

$$\alpha_2 = (75,63) \oplus 72 \otimes (37,35) \oplus 1377 \otimes (63,36) \oplus 3510 \otimes (1,2)$$

$$\alpha_2 = (75,63) \oplus (11,87) \oplus (95,4) \oplus (63,36)$$

$$\alpha_2 = (46,11) \oplus (37,35)$$

$$\alpha_2 = (75,34)$$

Another component of the second element of the proof is:

$$\beta_2 = g^{(h(\psi(e))+s)(h(\psi(f))+s)}$$

where $$\psi(e) = g^{(h(e4)+s)(h(e5)+s)(h(e6)+s)}$$

and $$\psi(f) = g^{(h(e7)+s)(h(e8)+s)(h(e9)+s)}$$

Using the hashes of the elements $e_i$, $\forall i=1, \ldots, 9$, the Authority is able to determine $\psi(e)$ and $\psi(f)$ without having access to the value of each element. The Authority is then able to hash the following local digests and communicate the following hashes to the participant.

| Node (v) | d | e | f |
|---|---|---|---|
| $\psi(v)$ | (75, 34) | (53, 3) | (37, 62) |
| $\psi'(v)$ | 62 | 49 | 19 |

In an embodiment, the participant in possession of $e_3$ only needs to receive the hashes of the digest of the two siblings of her parents, i.e. $\psi'(e)$ and $\psi'(f)$, and, therefore, the participant learns little about the structure of the tree outside its own path. The participant can therefore produce a digest with condensed information, proving the participant's knowledge of one element in the tree.

Using elliptic curve arithmetic $\beta_2$ can be expressed in a form similar to $\beta_1$ as follows:

$$\beta_2 = s^2 \otimes g \oplus ([\psi'(e) + \psi'(f)] \times s) \otimes g \oplus [\psi'(e) \times \psi'(f)] \otimes g$$

$$\beta_2 = (37,35) \oplus [49+19] \otimes (63,36) \oplus [49 \times 19] \otimes (1,2)$$

$$\beta_2 = (37,35) \oplus (2,95) \oplus (79,67)$$

$$\beta_2 = (55,79) \oplus (79,67)$$

$$\beta_2 = (36,57)$$

The above example demonstrates how to compute each component of the proof elements, in an embodiment.

In an embodiment, using the first component of the second element of the proof, $\alpha_2$, a participant can compute the global digest of the accumulation tree as follows:

$$\psi(r) = \beta_2^{s+h(\alpha_2)}$$

Or $$\psi(r) = \psi(v_2)$$

$$\psi(r) = s^3 \otimes g \oplus ([h(\alpha_2) + \psi'(e) + \psi'(f)] \times s^2) \otimes g \oplus ([h(\alpha_2) \times \psi'(e) + h(\alpha_2) \times \psi'(f) + \psi'(e) \times \psi'(f)] \times s) \otimes g \oplus [h(\alpha_2) \times \psi'(e) \times \psi'(f)] \otimes g$$

$$\psi(r) = (75,63) \oplus [62+49+19] \otimes (37,35) \oplus [62 \times 49 + 62 \times 19 + 49 \times 19] \otimes (63,36) \oplus [62 \times 49 \times 19] \otimes (1.2)$$

$$\psi(r) = (75,63) \oplus 130 \otimes (37,35) \oplus 5147 \otimes (63,36) \oplus 57722 \otimes (1,2)$$

$$\psi(r) = (75,63) \oplus (55,79) \oplus (3,4) \oplus (29,25)$$

$$\psi(r) = (53,94) \oplus (15,46)$$

$$\psi(r) = (40,96)$$

In an embodiment, a transaction script of a Bitcoin transaction may be locked with a hash of the global digest $\psi(r)$. The transaction can be unlocked by a participant (group member) that is able to access the value of the participant's own element and therefore is able to compute the global digest of the tree.

Figure 5:
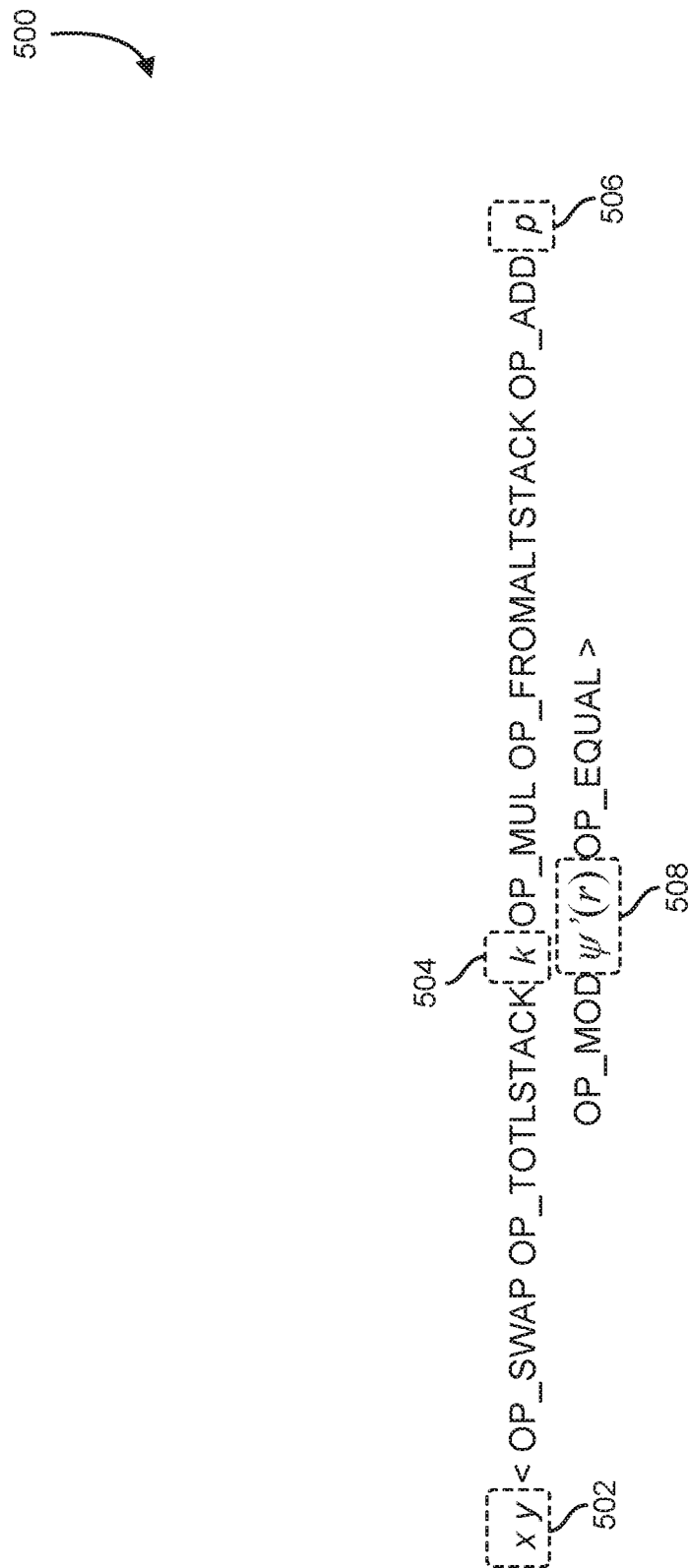
FIG. 5 illustrates an example of a script locked with the hash of a digest $\psi'(r)$, in an embodiment.

An example of a script 500 locked with the hash of the digest $\psi'(r)$ is illustrated in FIG. 5. An unlocking script 502 contains the x,y coordinate of the global digest $\psi(r)$ 508 (which is a point on the elliptic curve). As hashing function $h: \mathbb{G} \rightarrow \mathbb{Z}_p^*$ we choose to use $$h: (x,y) \rightarrow x + 2^k y \pmod{p}$$

with $2^k > p$. Note that in FIG. 5 we indicate k (as indicated at 504)$=2^k$, and the modulus is p (as indicated at 506). The script 500 verifies that by hashing the coordinates x, y of $\psi(r)$ we indeed obtain $\psi'(r)$ (as indicated at 508). To be able to use the above-mentioned hash function the opcodes OP_MUL and OP_MOD should be re-enabled.

The following description describes various embodiments where the construction of the accumulation tree is performed in a decentralised manner. For example, where the participants communicate amongst each other in order to create the trapdoor information and exchange the information to be able to individually compute the global digest of their accumulation tree.

An embodiment of the decentralised protocol is described below which includes three phases:

Construction of the accumulation tree;
Secret sharing and secret reconstruction; and
Digest computation.

Construction of the Accumulation Tree

In an embodiment, we describe a system in which n participants $S = \{U_1, U_2, \ldots, U_n\}$ wish to construct their accumulation tree $T(\varepsilon)$. In an embodiment, each participant $U_1$ is in possession of an element $e_i$ whose value is private to the participant. The participants initially agree on the parameter $0 < \varepsilon < 1$, which determines the number of levels in the accumulation tree as $$l = \left\lceil \frac{1}{\varepsilon} \right\rceil.$$

The number of children nodes per node is $O(n^\varepsilon)$.

Figure 6:
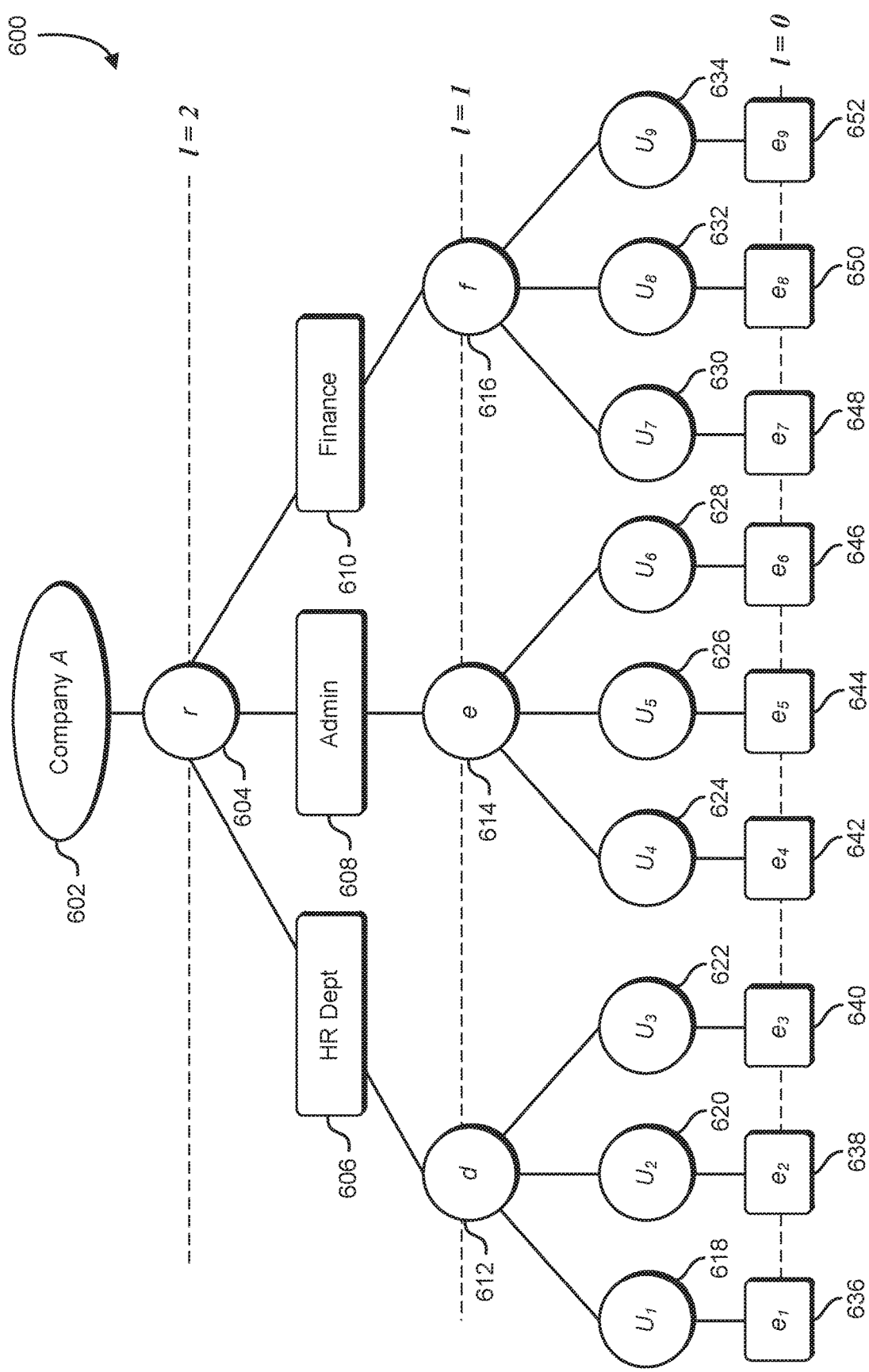
FIG. 6 illustrates an example of an accumulation tree for a set of participants belonging to a company, in an embodiment.

FIG. 6 illustrates an example of an accumulation tree 600 for a set of participants belonging to a company 602, in an embodiment. In an embodiment, the group of participants is organized in a specific structure based at least in part on the structure of the company. For example, if participants are members of a company 602 with an internal structure as illustrated in FIG. 6, the number of levels and the sub-sets of the accumulation tree are determined by the participants' positions with the company structure.

In the example shown in FIG. 6, the company is represented by a root node 604 in the accumulation tree. The company contains an HR department 606, and administration department 608, and a finance department 610. The HR department 606 is represented in the accumulation by a first intermediate node 612. The administration department 608 is represented by a second intermediate node 614. The finance department 610 is represented by a third intermediate node 616.

In an embodiment, each department has a number of entities (people, employees, computer systems, or devices), and each entity is represented by a leaf node that is a child of the corresponding intermediate node. For example, the first intermediate node 612 has three child nodes 618, 620, and 622 that have three corresponding credentials 636, 638, and 640. For example, the second intermediate node 614 has three child nodes 624, 626, and 628 that have three corresponding credentials 642, 644, and 646. For example, the third intermediate node 616 has three child nodes 630, 632, and 634 that have three corresponding credentials 648, 650, and 652.

In an embodiment, if the group is not organized in a specific hierarchical structure, then the participants agree on the number p of elements in sub-trees. In the example, in FIG. 6 the parameter is determined to be p=3, and each node has two sibling nodes (located at the same level l). Participants communicate to find and exchange information with p−1 other users.

In FIG. 6, for instance, participant $U_1$ (located at 618) would communicate with the participants $U_2$ (at 620) and $U_3$ (at 622). In embodiments that use a random order of participants, the participants (thus their elements) are randomly allocated to sub-groups in the tree.

Secret Sharing and Secret Reconstruction

In an embodiment, the participants collaborate with each other to agree on a shared secret s using the secret sharing procedure described above. The secret s is used as the trapdoor information of the accumulation tree and will generally only be available to the members of set S.

Figure 7:
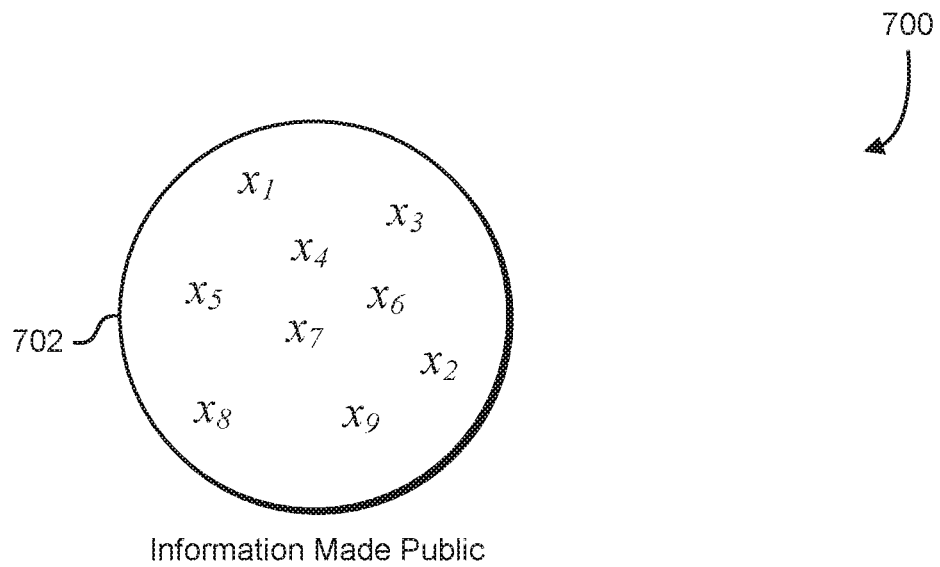
FIG. 7 illustrates an example of information that is exchanged as part of secret sharing and secret reconstruction for a decentralised protocol, in an embodiment.
Figure 7:
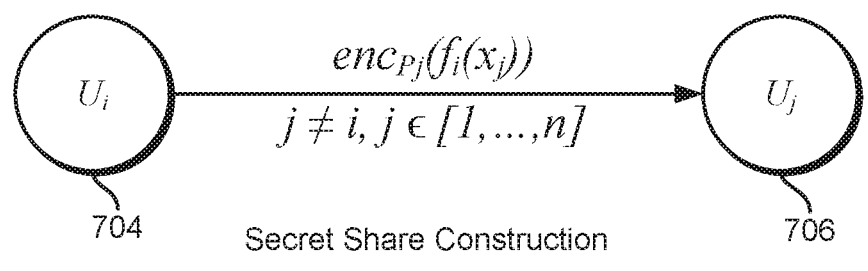
Figure 7:
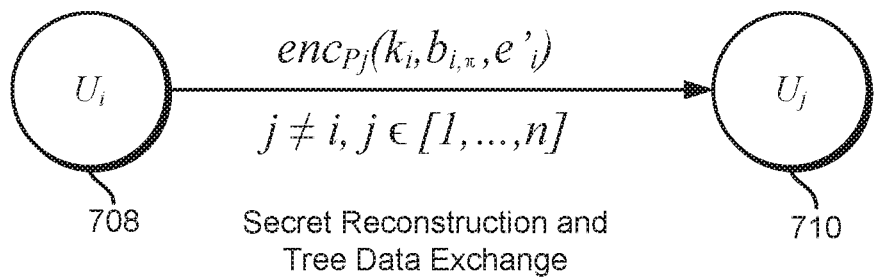

FIG. 7 illustrates an example of information 700 that is exchanged as part of secret sharing and secret reconstruction for a decentralised protocol, in an embodiment. As shown in FIG. 7, each player $U_i$ is assigned $x_1$ and this information is made public (see FIG. 7 at 702). Each player $U_i$ 704 generates a random polynomial $f_i(x)$ with degree t and secretly sends (encrypted with the respective recipient's public key) every other player 706 their respective point on the polynomial, namely $f_i(x_j)$ mod n to $U_j$ (see FIG. 7, at 704, 706).

Each player $U_i$ sums all the received $f_1(x_i)$, $f_2(x_i)$, ... $f_p(x_i)$ (all mod n, where n is the order of the group generated by the point g on the elliptic curve) and constructs the player's share on the polynomial $k_i = f(x_i)$ mod n.

After the participants have agreed on their shares, the participants are able to collaborate to reconstruct the secret s, which is used to compute the digest of the accumulation tree. To reconstruct the secret each player shares a) their respective share $k_i$ and b) $b_{i,\pi}$, their Lagrange basis polynomials.

Digest Computation

The participants share information which is used to a) reconstruct the common secret s and b) compute their respective individual proofs and the global digest of the tree.

Multiple implementations are possible when determining the digests, two of which are described below. Additional implementations may be possible.

Case 1—Participants are interested in computing the global digest of the accumulation tree. They do not wish to use any intermediate accumulation value or local digest to sign transactions.

In such an implementation, each participant shares the hash of the participant's value $e_i'$ with the other participants. Independently of the hierarchical structure chosen for the tree, since the trapdoor s is known by all users together with the hash of all the elements of the set S, every participant is able to compute the global digest of the accumulation tree when expressed as follows:

$$\psi(r) = g^{(e_1'+s)(e_2'+s)\cdots(e_n'+s)}.$$

In this case, all participants will be able to compute the local digests—in our example in FIG. 6 $\psi(d)$, $\psi(e)$, $\psi(f)$—hence, those quantities cannot be used to lock transactions, i.e., any participant can sign, independently of the subgroup the participant belongs to.

The hash of the value $e_i'$ in this case can be communicated to all participants 710 together with the information needed to reconstruct the secret to optimize the communication rounds as shown in FIG. 7 at 708 and 710.

In various embodiments, the hash of the digest may be used in a locking script. For example, the script shown in FIG. 5 may be used.

Case 2—Participants are interested in computing both the global digest and the local ones and, in some examples, use them to lock transaction scripts. In this implementation, we desire that only users in a particular subgroup are able to compute their local digests.

For example referring to FIG. 6, we want only users $U_1$, $U_2$, $U_3$ to be able to compute $\psi(d)$ In this way, a transaction script may be locked with $\psi'(d)$ (the hash of the local digest) and any of the three participants will be able to unlock the transaction by providing the pre-image of the hash $\psi(d)$.

In this embodiment only participants considered siblings (in the example of FIG. 6 $U_1$, $U_2$, $U_3$) will communicate to exchange the hash of their value $e_i'$, i=1, 2, 3. The hash values will only be exchanged among the siblings of a given sub-tree differently from Case 1 described above, allowing this subgroup of participants to compute the digest of their common parent, ($U_1$, $U_2$, $U_3$) compute $\psi(d)$. The other participants ($U_4$, ..., $U_9$) will receive condensed information, namely the hash of the latter. Hence, in this example, the protocol will use two extra communication rounds as shown in FIG. 8.

Figure 8:
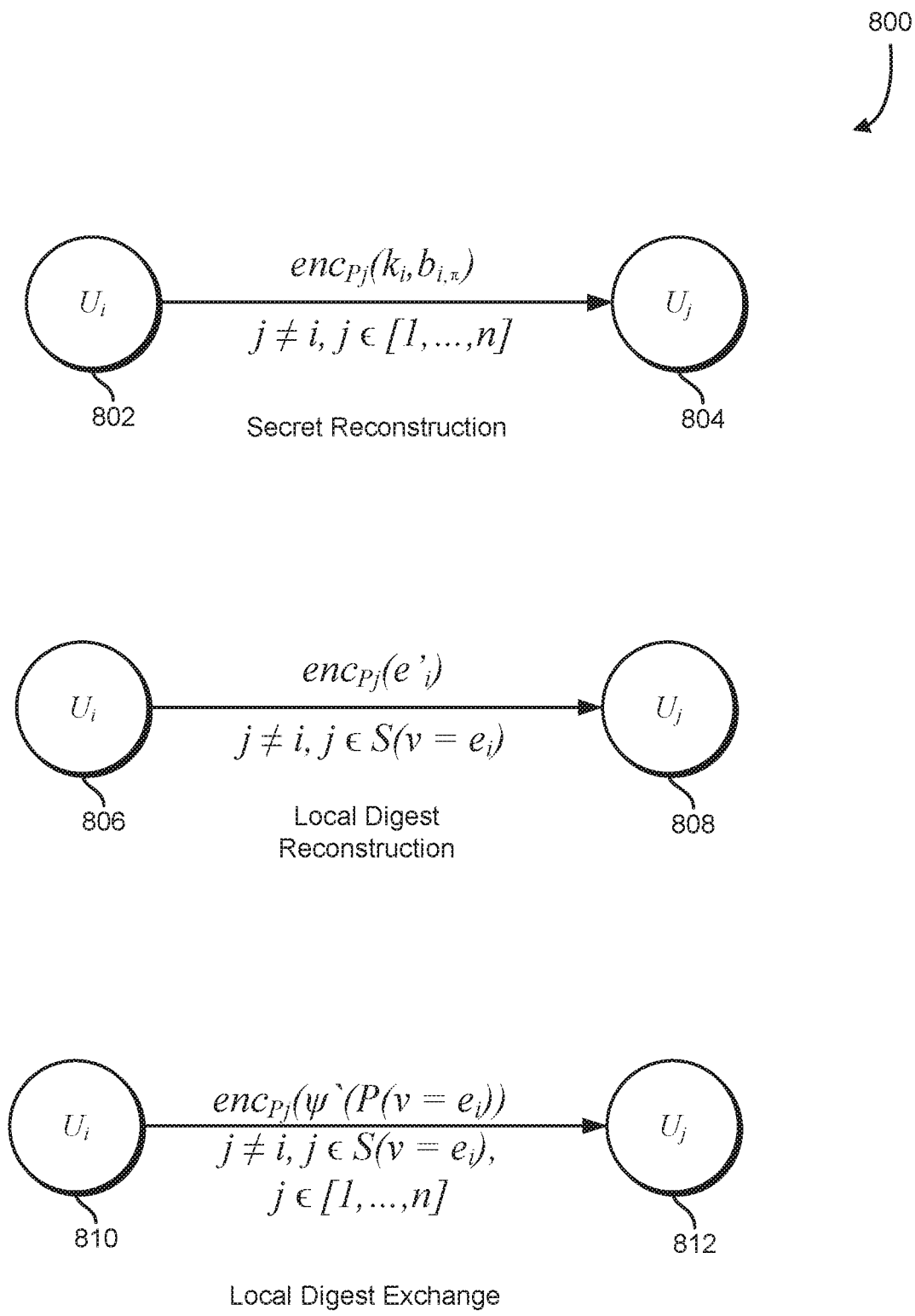
FIG. 8 illustrates an example of information that is exchanged as part of secret sharing and secret reconstruction for a decentralised protocol, in an embodiment.

FIG. 8 illustrates an example of information that is exchanged as part of secret sharing and secret reconstruction for a decentralised protocol, in an embodiment. First, the secret shares are exchanged between all the participants at 802 and 804, then the local digests are reconstructed between the siblings at 806 and 808, and then the hash of the local digests are communicated to the participants at 810 and 812.

Given the hashes of the local digests of the other subtrees, all of the participants are able to compute the global digest of the accumulation tree without knowing the hashes of the values of all the participants $e_i'$. In one implementation, given that the trapdoor s is known to all participants as well, the global digest can be computed as follows:

$$\psi(r) = g^{(h(\psi(d))+s)(h(\psi(e))+s)(h(\psi(f))+s)}.$$

In this second case, participants of the protocol are able to reconstruct different information related to the accumulation tree, depending on their respective position in the tree. A hierarchy is therefore in place, where participants assume different roles based at least in part on their respective positions in the hierarchy.

For example, referring to FIG. 6, it is possible to create a transaction whose output is locked with $\psi'(e)$ or $\psi'(f)$, so that only a participant belonging to the 'Admin' group or the 'Finance' group could sign the transaction, hence unlocking the associated funds. In one implementation, the transaction is a cryptocurrency transaction such as a Bitcoin transaction.

Figure 9:
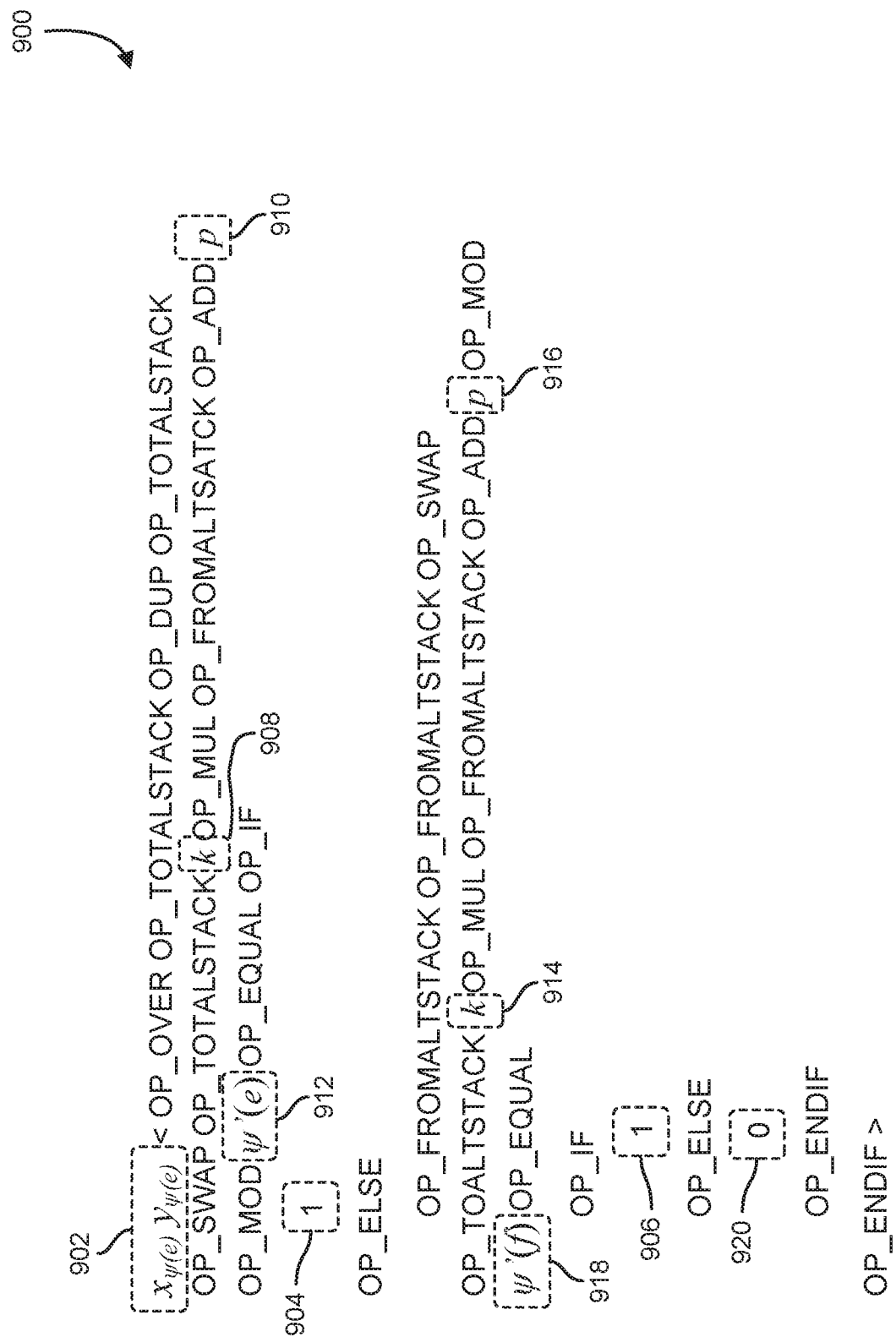
FIG. 9 illustrates an example of a transaction locking script for a decentralised protocol where any participant from one or more groups can unlock the associated output by providing the coordinates of the parent digest, in an embodiment.

FIG. 9 illustrates an example of a transaction locking script for a decentralised protocol where any participant from one or more groups can unlock the associated output by providing the coordinates of the parent digest, in an embodiment. The locking script 900 is contained within the brackets < >. The funds can be unlocked by providing in the unlocking script either the x, y coordinates of the local digest $\psi(e)$ (indicated with $x_{\psi(e)}, y_{\psi(e)}$ at 902) or of the local digest $\psi(f)$ ($x_{\psi(f)}, y_{\psi(f)}$). The locking script contains the hash of the local digests, namely $\psi'(e)$ 912 and $\psi'(f)$ 918. In FIG. 9, we illustrate one possible redeem script where a participant provides the coordinate of the local digest $\psi(e)$ (for example, the participant belongs to the "Admin" group).

We choose the following hashing function $h: \mathbb{G} \to \mathbb{Z}_p^*$:

$$h:(x,y) \to x + 2^k y \pmod{p}$$

with $2^k > p$. Note that in FIG. 9 as well we indicate $= 2^k$. The script verifies that by hashing the coordinates x,y provided in the unlocking script, the result corresponds to the hash of one of the two local digests, ψ'(e) or ψ'(f). Additional parameters in the script include the modulus p 910, 916, and the power k 908, 914. In an embodiment, the remaining parameters 904, 906, and 920 are result codes and indicate whether the script was successful or not.

To be able to use the above hash function, the OP_CODES OP_MUL and OP_MOD should be supported.

Figure 10:
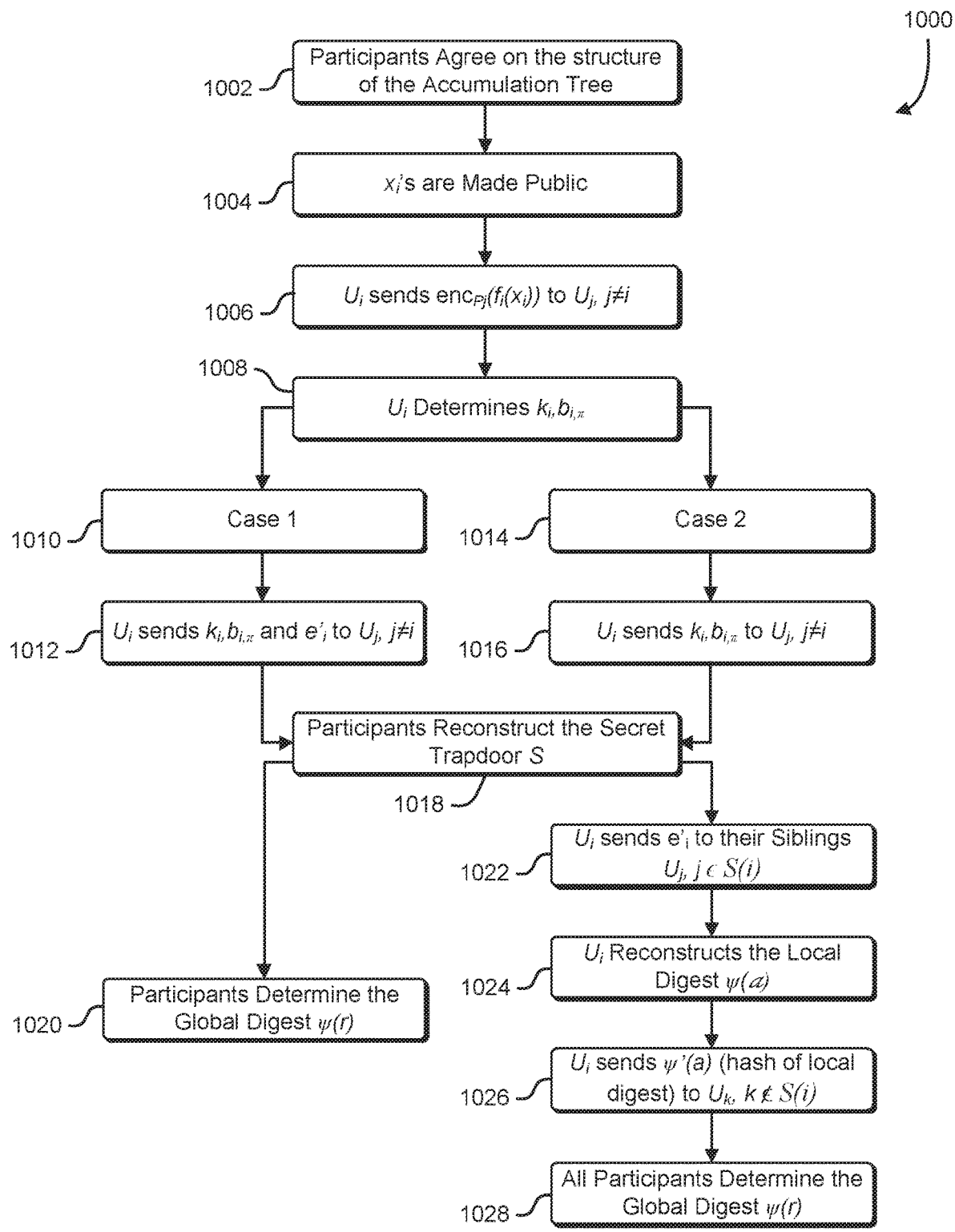
FIG. 10 illustrates an example of a decentralised protocol to reconstruct the global digest, in an embodiment.

FIG. 10 illustrates an example of a decentralised protocol 1000 to reconstruct the global digest, in an embodiment. FIG. 10 displays, in the form of a flowchart, operations performed for Case 1 and Case 2 of the decentralised version of the protocol that reconstructs the global digest of the accumulation tree. The operations illustrated in FIG. 10 may, in various embodiments, be performed by computer systems that are associated with various participants or group members. The protocol illustrated in FIG. 10 may be implemented as instructions stored on memory of the computer system that, when executed by a processor of the computer system, perform the described and illustrated operations.

In an embodiment, at block 1002, the participants agree on the structure of the accumulation tree to be used. In an embodiment, the participants negotiate a set of parameters for the accumulation tree that include a number of levels in the accumulation tree, and a number of child nodes for each intermediate node in the accumulation tree.

The participants perform a number of operations that establish a shared secret. At block 1004, each participant $U_i$ is assigned $x_i$ and this information is made public. Each participant $U_i$ generates a random polynomial $f_i(x)$ with degree t and secretly sends 1006 (encrypted with the respective recipient's public key) every other participant 706 the participant's respective point on the polynomial, in some examples, $f_i(x_j)$ mod n to $U_j$ (where j≠i). Each player $U_i$ sums all the received $f_1(x_i), f_2(x_i), \ldots f_p(x_i)$ (all mod n, where n is the order of the group generated by the point g on the elliptic curve) and constructs 1008 the player's share on the polynomial $k_i = f(x_i)$ mod n.

After the participants have agreed on their shares, the participants are able to collaborate to reconstruct the secret s, which is used to compute the digest of the accumulation tree. In a first implementation labelled Case 1 1010, to reconstruct the secret each player shares 1012 a) their respective share $k_i$ b) $b_{i,\pi}$, their Lagrange basis polynomials, and c) the hash of their value $e'_i$. In a second implementation labelled Case 2 1014, to reconstruct the secret each player shares 1016 a) their respective share $k_i$ and b) $b_{i,\pi}$, their Lagrange basis polynomials. In both cases, at block 1018, the participants are able to reconstruct the secret s as described above.

In each case, the participants determine the digests as follows. In Case 1, at block 1020, the participants are able to determine the global digest. In Case 2, the hash values will only be exchanged 1022 among the siblings of a given sub-tree, thereby allowing this subgroup of participants to compute 1024 the digest of their common parent ψ(a). The other participants are provided 1026 with condensed information, namely the hash of the above. In an embodiment, Case 2 of the protocol will use extra communication rounds as shown. First, the secret shares are exchanged between all the participants, then the local digests are reconstructed between the siblings, and then the hash of the local digests are communicated to the participants. If desired, in some embodiments, the participants may determine the global digest at block 1028.

Various embodiments described in this paper provide a solution to efficiently prove membership to a group and authorize the transfer of digital assets on a blockchain network.

In some implementations, the protocol is based on bilinear map accumulators that allow condensing the information about the whole group or set of elements in a constant-sized object, the digest of the accumulation tree. Information about the group is hierarchically stored in the accumulation tree in local (intermediate layers) and global (root of the tree) digests.

In one embodiment, a centralised protocol is described where an Authority provides condensed information about the accumulation tree to users so they can compute their proof of membership and a decentralised version, where the users themselves collaborate to construct local digests and exchange information to compute their individual proof of membership. In another embodiment, a decentralised version of the protocol is described using the accumulators. The decentralised solution is also efficient in terms of communication rounds between participants, as the information needed to construct the local and global digests of the accumulation tree need be communicated (i) only to the relevant (and minimal number of) participants and (ii) in the same communication round where possible.

In various implementations, the actual values that are stored in the set need not be communicated to other members or the Authority, but only their hash values. This means that, if the elements of the group are public keys or other types of pseudonyms and anonymous credentials, they are never publicly disclosed.

The participants can use the global or local digest(s), based at least in part on the use case, to lock the transaction script. In this way, with a script of reasonable size any of the users belonging to a given group (or sub-group within the hierarchy) can authorize digital transfers via transactions.

Figure 11:
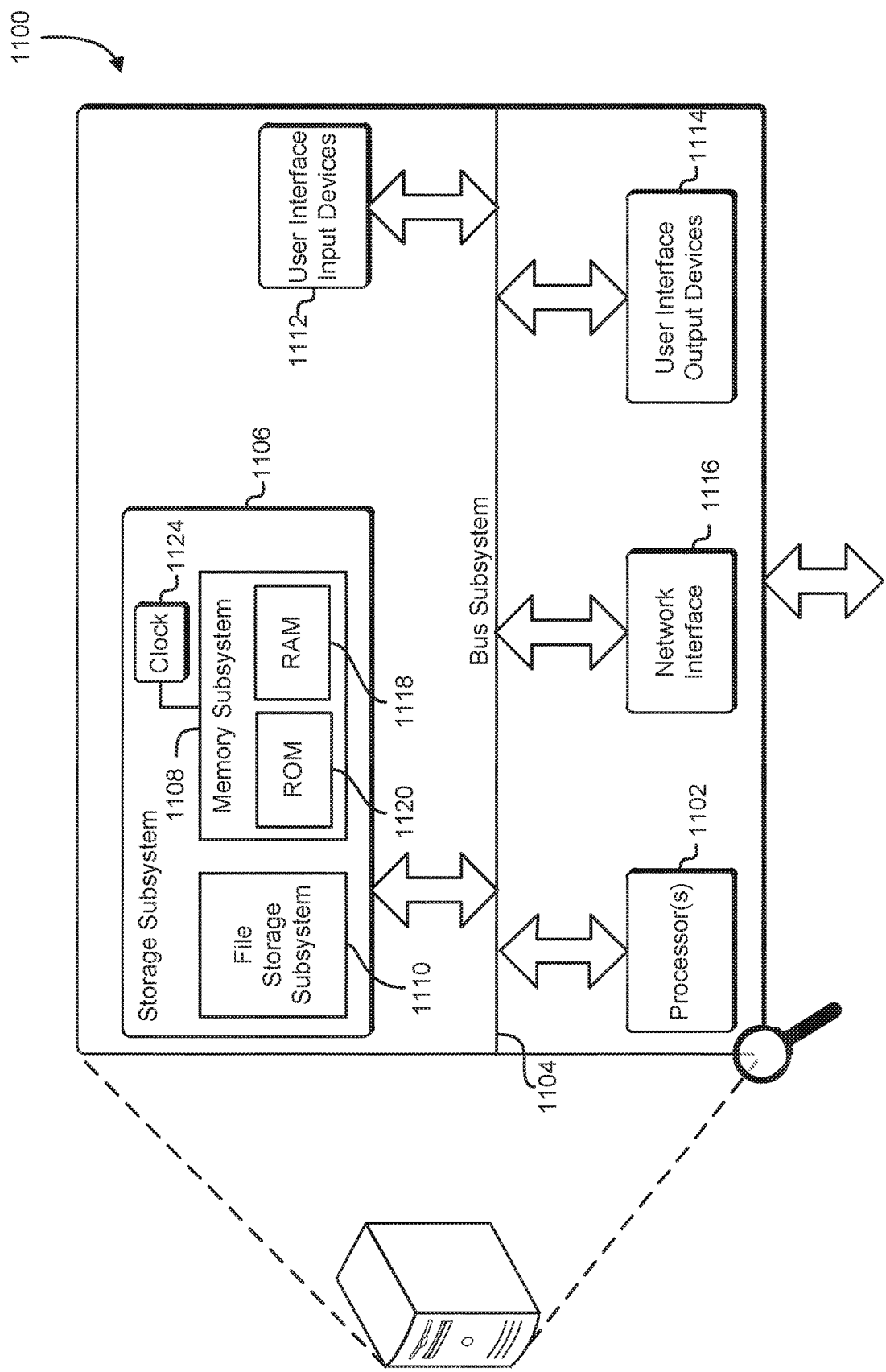
FIG. 11 illustrates a computer system in which various embodiments can be implemented.

FIG. 11 is an illustrative, simplified block diagram of a computing device 1100 that can be used to practice at least one embodiment of the present disclosure. In various embodiments, the computing device 1100 can be used to implement any of the systems illustrated and described above. For example, the computing device 1100 can be configured for use as a data server, a web server, a portable computing device, a personal computer, or any electronic computing device. As shown in FIG. 11, the computing device 1100 could include one or more processors 1102 that, in embodiments, are configured to communicate with and are operatively coupled to a number of peripheral subsystems via a bus subsystem 1104. In some embodiments, these peripheral subsystems include a storage subsystem 1106 comprising a memory subsystem 1108 and a file/disk storage subsystem 1110, one or more user interface input devices 1112, one or more user interface output devices 1114, and a network interface subsystem 1116. Such storage subsystem 1106 could be used for temporary or long-term storage of information.

In some embodiments, the bus subsystem 1104 provides a mechanism for enabling the various components and subsystems of computing device 1100 to communicate with each other as intended. Although the bus subsystem 1104 is shown schematically as a single bus, alternative embodiments of the bus subsystem utilize multiple busses. In some embodiments, the network interface subsystem 1116 provides an interface to other computing devices and networks. The network interface subsystem 1116, in some embodiments, serves as an interface for receiving data from and transmitting data to other systems from the computing device 1100. In some embodiments, the bus subsystem 1104 is utilised for communicating data such as details, search terms, and so on.

In some embodiments, the user interface input devices 1112 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1100. In some embodiments, the one or more user interface output devices 1114 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1100. The one or more user interface output devices 1114 can be used, for example, to present user interfaces to facilitate user interaction with applications performing processes described and variations therein, when such interaction may be appropriate.

In some embodiments, the storage subsystem 1106 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1106. These application modules or instructions can be executed by the one or more processors 1102. In various embodiments, the storage subsystem 1106 additionally provides a repository for storing data used in accordance with the present disclosure. In some embodiments, the storage subsystem 1106 comprises a memory subsystem 1108 and a file/disk storage subsystem 1110.

In embodiments, the memory subsystem 1108 includes a number of memories, such as a main random access memory (RAM) 1118 for storage of instructions and data during program execution and/or a read only memory (ROM) 1120, in which fixed instructions can be stored. In some embodiments, the file/disk storage subsystem 1110 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1100 includes at least one local clock 1124. The local clock 1124, in some embodiments, is a counter that represents the number of ticks that have transpired from a particular starting date and, in some embodiments, is located integrally within the computing device 1100. In various embodiments, the local clock 1124 is used to synchronize data transfers in the processors for the computing device 1100 and the subsystems included therein at specific clock pulses and can be used to coordinate synchronous operations between the computing device 1100 and other systems in a data centre. In another embodiment, the local clock is a programmable interval timer.

The computing device 1100 could be of any of a variety of types, including a portable computer device, tablet computer, a workstation, or any other device described below. Additionally, the computing device 1100 can include another device that, in some embodiments, can be connected to the computing device 1100 through one or more ports (e.g., USB, a headphone jack, Lightning connector, etc.). In embodiments, such a device includes a port configured to accept a fibre-optic connector. Accordingly, in some embodiments, this device is configured to convert optical signals to electrical signals that are transmitted through the port connecting the device to the computing device 1100 for processing. Due to the ever-changing nature of computers and networks, the description of the computing device 1100 depicted in FIG. 11 is intended only as a specific example for purposes of illustrating the preferred embodiment of the device. Many other configurations having more or fewer components than the system depicted in FIG. 11 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B and C"

refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like do not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

SUMMARY

Techniques described and suggested in the present disclosure improve the field of computing, especially the field of blockchain transactions, by efficiently proving membership to a group and authorizing the transfer of digital assets on a blockchain network. Additionally, techniques described and suggested in the present disclosure improve the security of such transactions by reducing the amount of information disclosed when claiming a transaction output. In various implementations, the actual values that are stored in the set need not be communicated to other members or the Authority, but only their hash values. This means that, if the elements of the group are public keys or other types of pseudonyms and anonymous credentials they are never publicly disclosed. Moreover, techniques described and suggested in the present disclosure are necessarily rooted in computer technology in order to overcome problems specifically arising with determining group membership without the presence of a central authority that controls group membership. The decentralised solution is also efficient in terms of communication rounds between participants, as the information needed to construct the local and global digests of the accumulation tree need be communicated (i) only to the relevant participants and (ii) in the same communication round where possible.

The invention claimed is:

1. A computer-implemented method comprising:
generating a digest of an accumulation tree, each element of the accumulation tree representing a computer system in a set of computer systems;
generating a record for insertion into a distributed data structure, the record containing authorization information that is based at least in part on the digest; and
causing the record to be inserted into the distributed data structure; wherein
a subset of the set of computer systems share information of the subset with other members of the subset so that members of the subset are able to determine a local digest for the subset;
computer systems that are in the set of computer systems and not in the subset are not provided with the shared information and are unable to determine the local digest;
membership in set of computer systems is determined via an authoritative computer system; and
the authoritative computer system establishes, amongst the set of computer systems, a shared set of parameters associated with the accumulation tree, wherein:
a set of tree parameters are negotiated amongst the set of computer systems, the set of tree parameters including a tree depth and a number of child nodes per intermediate node; and
the accumulation tree is constructed in accordance with the set of tree parameters.

2. The computer-implemented method claimed in claim 1, wherein:
the record includes a locking script; and
the authorization information identifies a hash of a local digest of the accumulation tree.

3. The computer-implemented method claimed in claim 2, wherein:
the record includes an unlocking script; and
the authorization information identifies a number derived from the local digest represented by a point on an elliptic curve.

4. The computer-implemented method claimed in claim 1, wherein:
the record includes an unlocking script; and
the authorization information identifies a number derived from a global digest represented by a point on an elliptic curve.

5. The computer-implemented method claimed in claim 1, wherein a structure of the accumulation tree is determined based at least in part on an organisational structure associated with the set of computer systems.

6. The computer-implemented method claimed in claim 1, wherein the set of computer systems share information with each other that allows each computer system to reconstruct a common secret and a global digest of the accumulation tree.

7. The computer-implemented method claimed in claim 1, wherein the computer systems that are in the set of computer systems and not in the subset are provided with a hash of a local digest of a parent node of the subset of the set of computer systems.

8. The computer-implemented method claimed in claim 1, further comprising generating a witness that, in combination with the digest, proves membership in the set of computer systems.

9. The computer-implemented method claimed in claim 1, wherein each computer system in the set of computer systems shares a hash of a credential of the computer system with the other members of the set so that each member of the set is able to determine a global digest of the accumulation tree.

10. The computer-implemented method claimed in claim 1, wherein:
the distributed data structure is a blockchain; and
the record is a Bitcoin transaction record.

11. A system, comprising:
a processor; and
memory including executable instructions that, as a result of execution by the processor, cause the system to perform the computer-implemented method of claim 1.

12. A non-transitory computer-readable storage medium having stored thereon executable instructions that, as a result of being executed by a processor of a computer, cause the computer to at least perform the computer-implemented method of claim 1.

13. A system, comprising:
a processor; and
memory including executable instructions that, as a result of execution by the processor, cause the system to perform the computer-implemented method of claim 2.

14. A system, comprising:
a processor; and
memory including executable instructions that, as a result of execution by the processor, cause the system to perform the computer-implemented method of claim 3.

15. A system, comprising:
a processor; and
memory including executable instructions that, as a result of execution by the processor, cause the system to perform the computer-implemented method of claim 4.

16. A non-transitory computer-readable storage medium having stored thereon executable instructions that, as a result of being executed by a processor of a computer, cause the computer to at least perform the computer-implemented method of claim 2.

17. A non-transitory computer-readable storage medium having stored thereon executable instructions that, as a result of being executed by a processor of a computer, cause the computer to at least perform the computer-implemented method of claim 3.

* * * * *